United States Patent
Khoshnevisan et al.

(10) Patent No.: US 11,832,283 B2
(45) Date of Patent: Nov. 28, 2023

(54) DETAILS OF PHYSICAL UPLINK CONTROL CHANNEL (PUCCH) REPETITION WITH DIFFERENT BEAMS

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/937,256

(22) Filed: Jul. 23, 2020

(65) Prior Publication Data

US 2021/0029708 A1 Jan. 28, 2021

Related U.S. Application Data

(60) Provisional application No. 62/878,698, filed on Jul. 25, 2019.

(51) Int. Cl.
*H04W 4/00* (2018.01)
*H04W 72/53* (2023.01)
(Continued)

(52) U.S. Cl.
CPC ........... *H04W 72/53* (2023.01); *H04L 1/1819* (2013.01); *H04L 5/0055* (2013.01);
(Continued)

(58) Field of Classification Search
CPC ......... H04W 72/0406; H04W 72/0413; H04W 72/042; H04W 72/0446; H04L 5/0035; H04L 5/0055
See application file for complete search history.

(56) References Cited

U.S. PATENT DOCUMENTS

2020/0205150 A1* 6/2020 Cheng ................. H04B 7/0691
2020/0221448 A1* 7/2020 Park .................... H04W 72/042
2022/0279517 A1 9/2022 Khoshnevisan et al.

OTHER PUBLICATIONS

Huawei, et al., "HARQ Enhancements in NR Unlicensed," 3GPP Draft, 3GPP TSG RAN WG1 Meeting #96bis, R1-1905648, 3RD Generation Partnership Project (3GPP), Mobile Competence Centre, 650, Route Des Lucioles, F-06921, Sophia-Antipolis Cedex, France, vol. RAN WG1, No. Xi 'an, China; Apr. 8, 2019-Apr. 12, 2019, Apr. 8, 2019 (Apr. 8, 2019), XP051707707, 13 pages, Retrieved from the Internet: URL: http://www.3gpp.org/ftp/tsg%5Fran/WG1%5FRL1/TSGR1%5F96b/Docs/R1%2D1905648%2Ezip [retrieved on Apr. 8, 2019] section 4; figures 2, 3.
(Continued)

*Primary Examiner* — Bo Hui A Zhu
(74) *Attorney, Agent, or Firm* — Norton Rose Fulbright US LLP/Qualcomm Incorporated

(57) ABSTRACT

One or more aspects of physical uplink control channel (PUCCH) repetition is disclosed. In a particular implementation, a method of wireless communication includes receiving, by a user equipment (UE), downlink control information (DCI) including a physical uplink control channel resource indicator (PRI) field codepoint. The method also includes determining, based on the PRI field codepoint, whether to transmit a PUCCH repetition within a slot position using a single PUCCH resource or transmit multiple PUCCH repetitions within the slot position using multiple PUCCH resources. The method further includes transmitting multiple PUCCH repetitions within the slot position using the multiple PUCCH resources responsive to determining to transmit the multiple PUCCH repetitions within the slot position using the multiple PUCCH resources.

33 Claims, 13 Drawing Sheets

(51) Int. Cl.
*H04L 5/00* (2006.01)
*H04W 76/27* (2018.01)
*H04W 80/02* (2009.01)
*H04L 1/1812* (2023.01)
*H04W 72/0446* (2023.01)
*H04W 72/21* (2023.01)
*H04W 72/23* (2023.01)

(52) U.S. Cl.
CPC ....... *H04W 72/0446* (2013.01); *H04W 72/21* (2023.01); *H04W 72/23* (2023.01); *H04W 76/27* (2018.02); *H04W 80/02* (2013.01)

(56) References Cited

OTHER PUBLICATIONS

International Search Report and Written Opinion—PCT/US2020/043450—ISA/EPO—dated Oct. 15, 2020.
NTT Docomo, Inc., "Discussion on Multi-beam Enhancement," 3GPP Draft, 3GPP TSG RAN WG1 #97, R1-1906225, 3RD Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727679, pp. 1-24, Retrieved from the Internet: URL:http://www.3gpp.org/ftp/Meetings%5F3GPP%5FSYNC/RAN1/Docs/R1%2D1906225%2Ezip [retrieved on May 13, 2019] section 4.1.

* cited by examiner

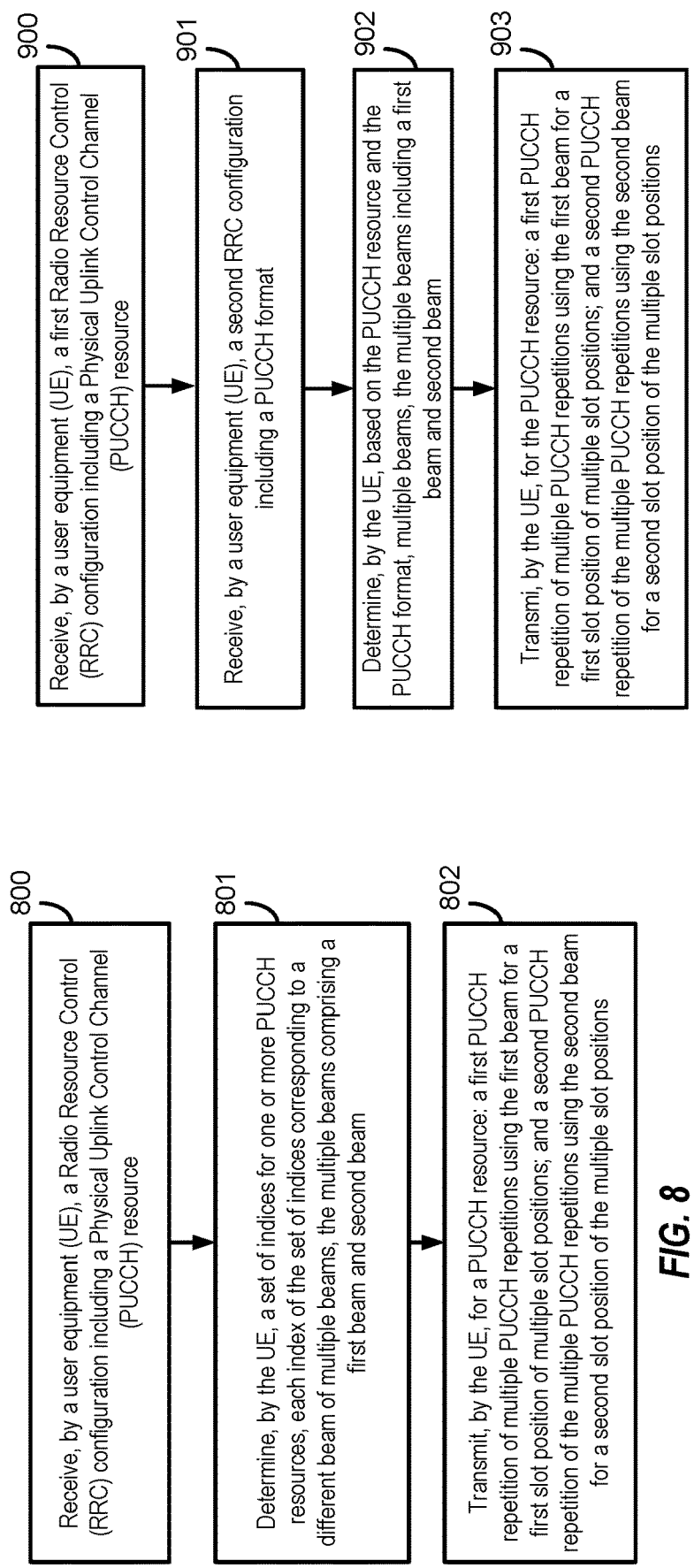

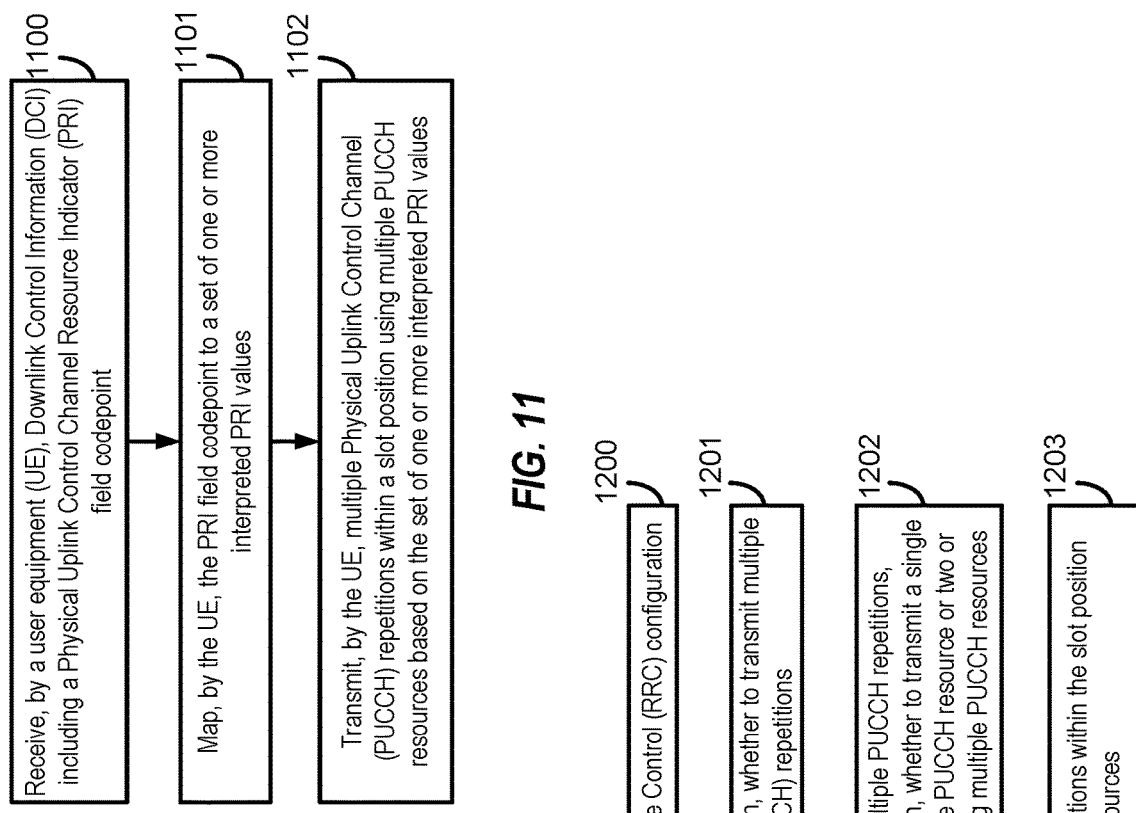
FIG. 11
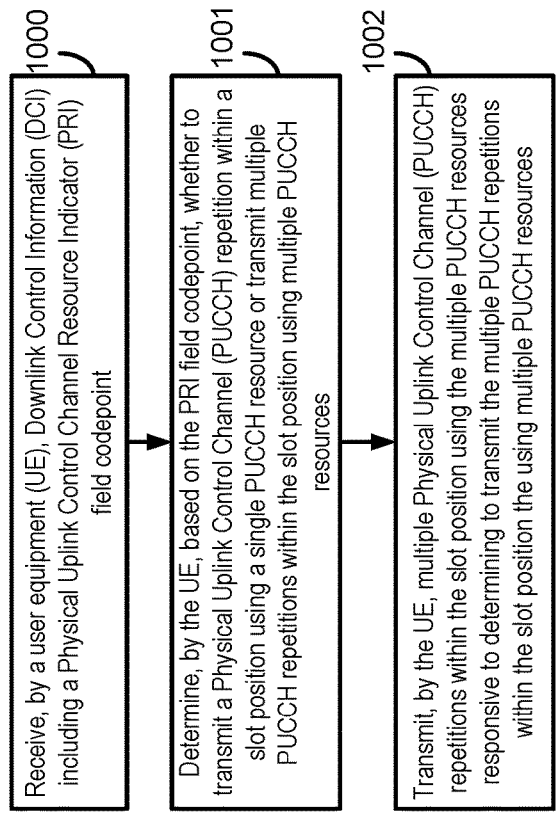
FIG. 10
FIG. 12

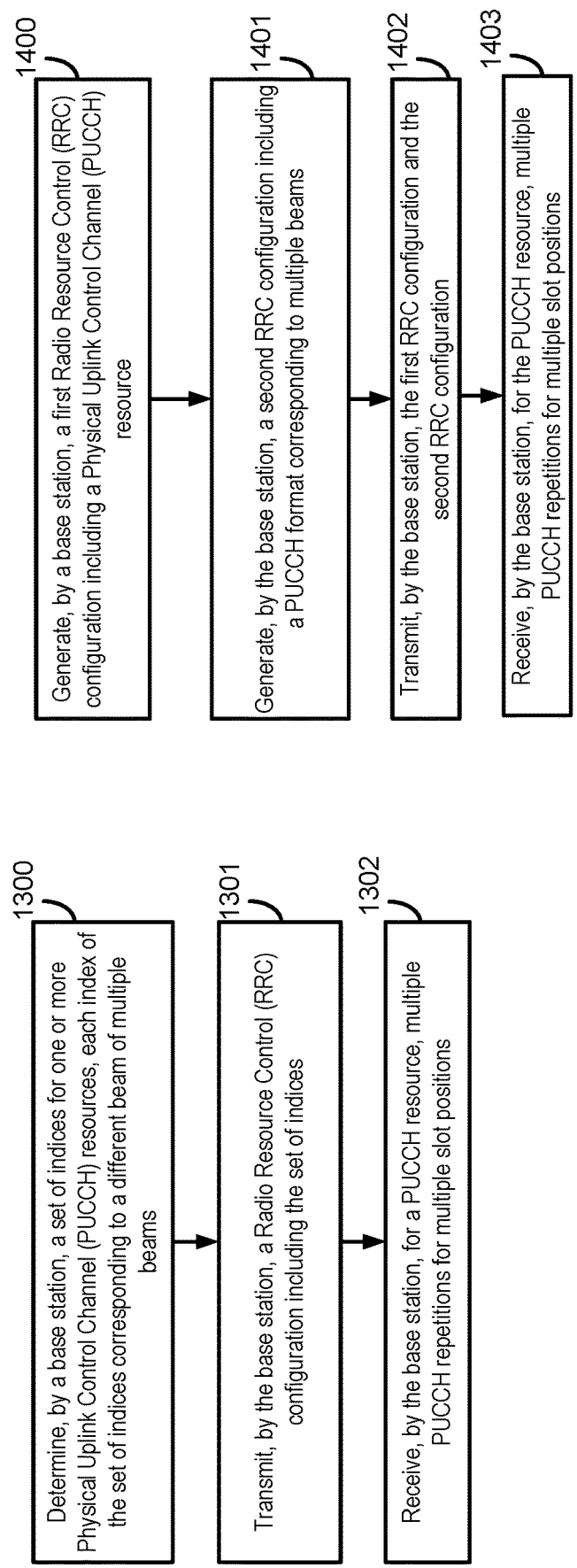

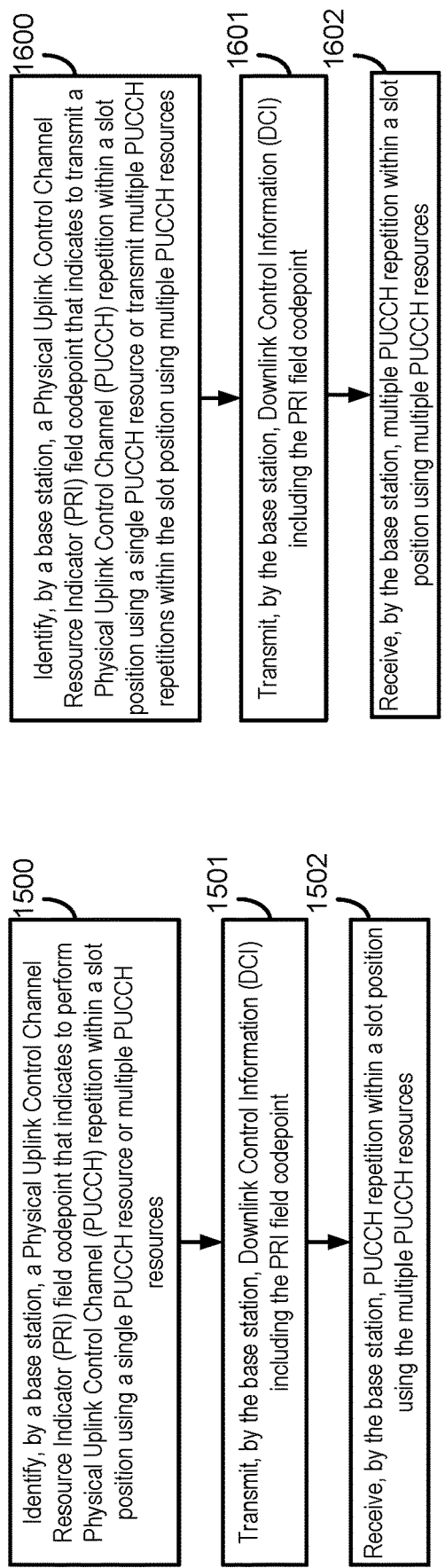
FIG. 15
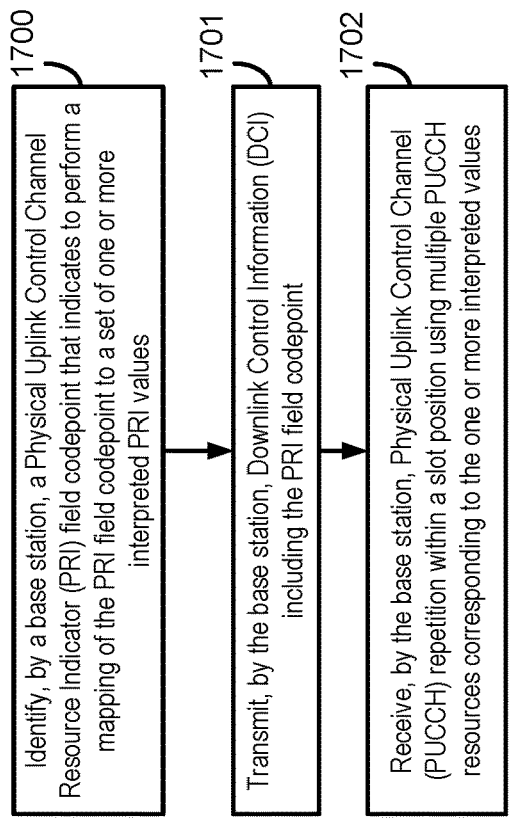
FIG. 16
FIG. 17

DETAILS OF PHYSICAL UPLINK CONTROL CHANNEL (PUCCH) REPETITION WITH DIFFERENT BEAMS

CROSS-REFERENCE TO RELATED APPLICATIONS

This application claims the benefit of U.S. Provisional Patent Application 62/878,698, entitled, "DETAILS OF PUCCH REPETITION WITH DIFFERENT BEAMS," filed on Jul. 25, 2019, which is expressly incorporated by reference herein in its entirety.

BACKGROUND

Field

Aspects of the present disclosure relate generally to wireless communication systems, and more particularly, to physical uplink control channel (PUCCH) repetition.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Physical uplink control channel (PUCCH) repetition in different slots was developed and implemented in Rel. 15 for PUCCH formats 1, 3, and 4. As implemented, the same PUCCH-SpatialRelationInfo is used in all repetitions. Additionally, a resource control configuration for a given PUCCH format provides the number of repetitions using a respective number of slots ("nrofSlots"). Accordingly, the same PUCCH resource is used across all the repetitions—i.e., for each slot. However, the approach implemented in Rel. 15 for PUCCH repetitions lacks flexibility and adaptability to account for changing network conditions.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), a radio resource control (RRC) configuration including a physical uplink control channel (PUCCH) resource. The method also includes determining, by the UE, a set of indices for one or more PUCCH resources. Each index of the set of indices corresponding to a different beam of multiple beams. The multiple beams includes a first beam and a second beam. The method further includes transmitting, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In another aspect of the disclosure, a method of wireless communication includes receiving, by a UE, a first RRC configuration including a PUCCH resource. The method also includes receiving, by the user device, a second RRC configuration including a PUCCH format. The method further includes determining, by the UE, based on the PUCCH resource and the PUCCH format, multiple beams. The multiple beams include a first beam and a second beam. The method includes transmitting, by the UE, for the PUCCH resource: a first PUCCH repetition of multiple PUCCH repetitions using the first beam for a first slot position of multiple slot positions, and a second PUCCH repetition of the multiple PUCCH repetitions using the second beam for a second slot position of the multiple slot positions.

In another aspect of the disclosure, a method of wireless communication includes receiving, by a UE, downlink control information (DCI) including a physical uplink control channel resource indicator (PRI) field codepoint. The method also includes determining, by the UE, based on the PRI field codepoint, whether to transmit a PUCCH repetition within a slot position using a single PUCCH resource or transmit multiple PUCCH repetitions within the slot position using multiple PUCCH resources. The method further includes transmitting, by the UE, multiple PUCCH repetitions within the slot position using multiple PUCCH resources responsive to determining to transmit the multiple PUCCH repetitions within the slot position using the multiple PUCCH resources.

In another aspect of the disclosure, a method of wireless communication includes receiving, by a UE, DCI including a PRI field codepoint. The method also includes mapping, by the UE, the PRI field codepoint to a set of one or more interpreted PRI values. The method further includes transmitting, by the UE, multiple PUCCH repetitions within a slot position using multiple PUCCH resources based on the set of one or more interpreted PRI values.

In another aspect of the disclosure, a method of wireless communication includes receiving, by a UE, a RRC configuration. The method also includes determining, by the UE, based on the RRC configuration, whether to transmit multiple PUCCH repetitions. The method further includes, in response to a determination to transmit the multiple PUCCH repetitions, determining, by the UE based on the RRC configuration, whether to transmit a single PUCCH repetition within a slot position using a single PUCCH resource or two or more PUCCH repetitions of the multiple PUCCH repetitions within the slot position using multiple PUCCH resources. The method further includes transmitting, by the UE, the two or more PUCCH repetitions within the slot position using the multiple PUCCH resources.

In another aspect of the disclosure, a method of wireless communication includes determining, by a base station, a set of indices for one or more PUCCH resources. Each index of the set of indices corresponding to a different beam of multiple beams. The method also includes transmitting, by the base station, an RRC configuration including the set of indices and a PUCCH resource. The method further includes receiving, by the base station, for the PUCCH resource, multiple PUCCH repetitions for multiple slot positions. Receiving the multiple PUCCH repetitions includes receiving a first PUCCH repetition of the multiple PUCCH repetitions via a first beam of the multiple beams for a first slot position of the multiple slot positions, and receiving a second PUCCH repetition of the multiple PUCCH repetitions via a second beam of the multiple beams for a second slot position of the multiple slot positions.

In another aspect of the disclosure, a method of wireless communication includes generating, by a base station, a first RRC configuration including a PUCCH resource. The method also includes generating, by the base station, a second RRC configuration including a PUCCH format corresponding to multiple beams. The method further includes transmitting, by the base station, the first RRC configuration and the second RRC configuration. The method includes receiving, by the base station, for the PUCCH resource, multiple PUCCH repetitions for multiple slot positions. Receiving the multiple PUCCH repetitions includes receiving a first PUCCH repetition of the multiple PUCCH repetitions using a first beam of the multiple beams for a first slot position of the multiple slot positions, and receiving a second PUCCH repetition of the multiple PUCCH repetitions using a second beam the multiple beams for a second slot position of the multiple slot positions.

In another aspect of the disclosure, a method of wireless communication includes identifying, by a base station, a PRI field codepoint that indicates to perform PUCCH repetition within a slot position using a single PUCCH resource or multiple PUCCH resources. The method also includes transmitting, by the base station, DCI including the PRI field codepoint. The method further includes receiving, by the base station, PUCCH repetition within a slot position using the multiple PUCCH resources.

In another aspect of the disclosure, a method of wireless communication includes identifying, by a base station, a PRI field codepoint that indicates to transmit a PUCCH repetition within a slot position using a single PUCCH resource or transmit multiple PUCCH repetitions within a slot position using multiple PUCCH resources. The method also includes transmitting, by the base station, DCI including the PRI field codepoint. The method further includes receiving, by the base station, multiple PUCCH repetitions within a slot position using multiple PUCCH resources.

In another aspect of the disclosure, a method of wireless communication includes identifying, by a base station a PRI field codepoint that indicates to perform a mapping of the PRI field codepoint to a set of one or more interpreted PRI values. The method also includes transmitting, by the base station, DCI including the PRI field codepoint. The method further includes receiving, by the base station, PUCCH repetition within a slot position using multiple PUCCH resources corresponding to the one or more interpreted PRI values.

In another aspect of the disclosure, a method of wireless communication includes identifying, by the base station, a PRI field codepoint that maps to a set of one or more interpreted PRI values. The method also includes transmitting, by the base station, DCI including the PRI field codepoint. The method further includes receiving, by the base station, PUCCH repetition within a slot position using multiple PUCCH resources corresponding to the one or more interpreted PRI values.

In another aspect of the disclosure, a method of wireless communication includes generating, by a base station, a RRC configuration that includes data that indicates whether to transmit multiple PUCCH repetitions using a single PUCCH resource or multiple PUCCH resources. The method also includes transmitting, by the base station, the RRC configuration. The method further includes receiving, by the base station, the multiple PUCCH repetitions within a slot position using the multiple PUCCH resources.

In an additional aspect of the disclosure, an apparatus configured for wireless communication includes means for receiving, by a UE, a RRC configuration including a PUCCH resource; means for determining, by the UE, a set of indices for one or more PUCCH resources, each index of the set of indices corresponding to a different beam of multiple beams, the multiple beams including a first beam and a second beam; and means for transmitting, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, a non-transitory computer-readable medium having program code recorded thereon. The program code includes code to receive, by a UE, a RRC configuration including a PUCCH resource; determine, by the UE, a set of indices for one or more PUCCH resources, each index of the set of indices corresponding to a different beam of multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication is disclosed. The apparatus includes at least one processor, and a memory coupled to the processor. The processor is configured to receive, by a UE, a RRC configuration including a PUCCH resource; determine, by the UE, a set of indices for one or more PUCCH resources, each index of the set of indices corresponding to a different beam of multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication includes means for receiving, by a UE, a first RRC configuration including a PUCCH resource; means for receiving, by the user device, a second RRC configuration including a PUCCH format; means for determining, by the UE, based on the PUCCH resource and the PUCCH format, multiple beams, the multiple beams including a first beam and a second beam; and means for transmitting, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, a non-transitory computer-readable medium having program code recorded thereon. The program code includes code to receive, by a UE, a first RRC configuration including a PUCCH resource; receiving, by the user device, a second RRC configuration including a PUCCH format; determining, by the UE, based on the PUCCH resource and the PUCCH format, multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication is disclosed. The apparatus includes at least one processor, and a memory coupled to the processor. The processor is configured to receive, by a UE, a first RRC configuration including a PUCCH resource; receiving, by the user device, a second RRC configuration including a PUCCH format; determining, by the UE, based on the PUCCH resource and the PUCCH format, multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication includes means for receiving, by a UE, a first RRC configuration including a PUCCH resource; means for receiving, by the user device, a second RRC configuration including a PUCCH format; means for determining, by the UE, based on the PUCCH resource and the PUCCH format, multiple beams, the multiple beams including a first beam and a second beam; and means for transmitting, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, a non-transitory computer-readable medium having program code recorded thereon. The program code includes code to receive, by a UE, a first RRC configuration including a PUCCH resource; receiving, by the user device, a second RRC configuration including a PUCCH format; determining, by the UE, based on the PUCCH resource and the PUCCH format, multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication is disclosed. The apparatus includes at least one processor, and a memory coupled to the processor. The processor is configured to receive, by a UE, a first RRC configuration including a PUCCH resource; receiving, by the user device, a second RRC configuration including a PUCCH format; determining, by the UE, based on the PUCCH resource and the PUCCH format, multiple beams, the multiple beams including a first beam and a second beam; and transmit, by the UE, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions.

In an additional aspect of the disclosure, an apparatus configured for wireless communication includes means for receiving, by a UE, DCI including a PRI field codepoint; means for determining, by the UE, based on the PRI field codepoint, whether to transmit a PUCCH repetition within a slot position using a single PUCCH resource or transmit multiple PUCCH repetitions within the slot position using multiple PUCCH resources; and means for transmitting, by the UE, multiple PUCCH repetitions within the slot position using the multiple PUCCH resources responsive to determining to transmit the multiple PUCCH repetitions within the slot position using the multiple PUCCH resources.

In an additional aspect of the disclosure, a non-transitory computer-readable medium having program code recorded thereon. The program code includes code to receive, by a UE, DCI including a PRI field codepoint; determine, by the UE, based on the PRI field codepoint, whether to transmit a PUCCH repetition within a slot position using a single PUCCH resource or transmit multiple PUCCH repetitions within the slot position using multiple PUCCH resources; and transmit, by the UE, multiple PUCCH repetitions within the slot position using the multiple PUCCH resources responsive to determining to transmit the multiple PUCCH repetitions within the slot position using the multiple PUCCH resources.

In an additional aspect of the disclosure, an apparatus configured for wireless communication is disclosed. The apparatus includes at least one processor, and a memory coupled to the processor. The processor is configured to receive, by a UE, DCI including a PRI field codepoint; determine, by the UE, based on the PRI field codepoint, whether to transmit a PUCCH repetition within a slot position using a single PUCCH resource or transmit multiple PUCCH repetitions within the slot position using multiple PUCCH resources; and transmit, by the UE, multiple PUCCH repetitions within the slot position using the multiple PUCCH resources responsive to determining to transmit the multiple PUCCH repetitions within the slot position using the multiple PUCCH resources.

In an additional aspect of the disclosure, an apparatus configured for wireless communication includes means for receiving, by a UE, DCI including a PRI field codepoint; means for mapping, by the UE, the PRI field codepoint to a set of one or more interpreted PRI values; and means for transmitting, by the UE, multiple PUCCH repetitions within a slot position using multiple PUCCH resources based on the set of one or more interpreted PRI values.

In an additional aspect of the disclosure, a non-transitory computer-readable medium having program code recorded thereon. The program code includes code to receive, by a UE, DCI including a PRI field codepoint; map, by the UE, the PRI field codepoint to a set of one or more interpreted PRI values; and transmit, by the UE, multiple PUCCH repetitions within a slot position using multiple PUCCH resources based on the set of one or more interpreted PRI values.

In an additional aspect of the disclosure, an apparatus configured for wireless communication is disclosed. The apparatus includes at least one processor, and a memory coupled to the processor. The processor is configured to receive, by a UE, DCI including a PRI field codepoint; map, by the UE, the PRI field codepoint to a set of one or more interpreted PRI values; and transmit, by the UE, multiple PUCCH repetitions within a slot position using multiple PUCCH resources based on the set of one or more interpreted PRI values.

In an additional aspect of the disclosure, an apparatus configured for wireless communication includes means for receiving, by a UE, a RRC configuration; means for determining, by the UE, based on the RRC configuration, whether to transmit multiple PUCCH repetitions; and means for, in response to a determination to transmit the multiple PUCCH repetitions, determining, by the UE, based on the RRC configuration, whether to transmit a single PUCCH repetition of the multiple PUCCH repetitions within a slot position using a single PUCCH resource or two or more PUCCH repetitions of the multiple PUCCH repetitions within the slot position using multiple PUCCH resources; and means for transmitting, by the UE, the two or more PUCCH repetitions within the slot position using the multiple PUCCH resources.

In an additional aspect of the disclosure, a non-transitory computer-readable medium having program code recorded thereon. The program code includes code to receive, by a UE, a RRC configuration; determine, by the UE, based on the RRC configuration, whether to transmit multiple PUCCH repetitions; in response to a determination to transmit the multiple PUCCH repetitions, determine, by the UE, based on the RRC configuration, whether to transmit a single PUCCH repetition of the multiple PUCCH repetitions within a slot position using a single PUCCH resource or two or more PUCCH repetitions of the multiple PUCCH repetitions within the slot position using multiple PUCCH resources; and transmit, by the UE, the two or more PUCCH repetitions within the slot position using the multiple PUCCH resources.

In an additional aspect of the disclosure, an apparatus configured for wireless communication is disclosed. The apparatus includes at least one processor, and a memory coupled to the processor. The processor is configured to receive, by a UE, a RRC configuration; determine, by the UE, based on the RRC configuration, whether to transmit multiple PUCCH repetitions; in response to a determination to transmit the multiple PUCCH repetitions, determine, by the UE, based on the RRC configuration, whether to transmit a single PUCCH repetition of the multiple PUCCH repetitions within a slot position using a single PUCCH resource or two or more PUCCH repetitions of the multiple PUCCH repetitions within the slot position using multiple PUCCH resources; and transmit, by the UE, the two or more PUCCH repetitions within the slot position using the multiple PUCCH resources.

In an additional aspect of the disclosure, an apparatus configured for wireless communication includes means for determining, by a base station, a set of indices for one or more PUCCH resources, each index of the set of indices corresponding to a different beam of multiple beams; means for transmitting, by the base station, a RRC configuration including the set of indices and a PUCCH resource; and means for receiving, by the base station, for the PUCCH resource, multiple PUCCH repetitions for multiple slot positions, where the means for receiving the multiple PUCCH repetitions include: means for receiving a first PUCCH repetition of the multiple PUCCH repetitions via a first beam of the multiple beams for a first slot position of the multiple slot positions; and means for receiving a second PUCCH repetition of the multiple PUCCH repetitions via a second beam of the multiple beams for a second slot position of the multiple slot positions.

In an additional aspect of the disclosure, a non-transitory computer-readable medium having program code recorded thereon. The program code includes code to determine, by a base station, a set of indices for one or more PUCCH resources, each index of the set of indices corresponding to a different beam of multiple beams; transmit, by the base station, a RRC configuration including the set of indices and a PUCCH resource; and receive, by the base station, for the PUCCH resource, multiple PUCCH repetitions for multiple slot positions, where to receive the multiple PUCCH repetitions include: receive a first PUCCH repetition of the multiple PUCCH repetitions via a first beam of the multiple beams for a first slot position of the multiple slot positions; and receive a second PUCCH repetition of the multiple PUCCH repetitions via a second beam of the multiple beams for a second slot position of the multiple slot positions.

In an additional aspect of the disclosure, an apparatus configured for wireless communication is disclosed. The apparatus includes at least one processor, and a memory coupled to the processor. The processor is configured to determine, by a base station, a set of indices for one or more PUCCH resources, each index of the set of indices corresponding to a different beam of multiple beams; transmit, by the base station, a RRC configuration including the set of indices and a PUCCH resource; and receive, by the base station, for the PUCCH resource, multiple PUCCH repetitions for multiple slot positions, where to receive the multiple PUCCH repetitions include: receive a first PUCCH repetition of the multiple PUCCH repetitions via a first beam of the multiple beams for a first slot position of the multiple slot positions; and receive a second PUCCH repetition of the multiple PUCCH repetitions via a second beam of the multiple beams for a second slot position of the multiple slot positions.

In an additional aspect of the disclosure, an apparatus configured for wireless communication includes means for generating, by a base station, a first RRC configuration including a PUCCH resource; means for generating, by the base station, a second RRC configuration including a PUCCH format corresponding to multiple beams; and means for transmitting, by the base station, the first RRC configuration and the second RRC configuration; and means for receiving, by the base station, for the PUCCH resource, multiple PUCCH repetitions for multiple slot positions, where the means for receiving the multiple PUCCH repetitions include: means for receiving a first PUCCH repetition of the multiple PUCCH repetitions using a first beam of the multiple beams for a first slot position of the multiple slot positions; and means for receiving a second PUCCH repetition of the multiple PUCCH repetitions using a second beam of the multiple beams for a second slot position of the multiple slot positions.

In an additional aspect of the disclosure, a non-transitory computer-readable medium having program code recorded thereon. The program code includes code to generate, by a base station, a first RRC configuration including a PUCCH resource; generate, by the base station, a second RRC configuration including a PUCCH format corresponding to multiple beams; and transmit, by the base station, the first RRC configuration and the second RRC configuration; and receive, by the base station, for the PUCCH resource, multiple PUCCH repetitions for multiple slot positions, where to receive the multiple PUCCH repetitions includes: receive a first PUCCH repetition of the multiple PUCCH repetitions using a first beam of the multiple beams for a first slot position of the multiple slot positions; and receive a second PUCCH repetition of the multiple PUCCH repetitions using a second beam of the multiple beams for a second slot position of the multiple slot positions.

In an additional aspect of the disclosure, an apparatus configured for wireless communication is disclosed. The apparatus includes at least one processor, and a memory coupled to the processor. The processor is configured to generate, by a base station, a first RRC configuration including a PUCCH resource; generate, by the base station, a second RRC configuration including a PUCCH format corresponding to multiple beams; and transmit, by the base station, the first RRC configuration and the second RRC configuration; and receive, by the base station, for the PUCCH resource, multiple PUCCH repetitions for multiple slot positions, where to receive the multiple PUCCH repetitions includes: receive a first PUCCH repetition of the multiple PUCCH repetitions using a first beam of the multiple beams for a first slot position of the multiple slot positions; and receive a second PUCCH repetition of the multiple PUCCH repetitions using a second beam of the multiple beams for a second slot position of the multiple slot positions.

In an additional aspect of the disclosure, an apparatus configured for wireless communication includes means for identifying, by a base station, a PRI field codepoint that indicates to perform PUCCH repetition within a slot position using a single PUCCH resource or multiple PUCCH resources; means for transmitting, by the base station, DCI including the PRI field codepoint; and means for receiving, by the base station, PUCCH repetition within the slot position using the multiple PUCCH resources.

In an additional aspect of the disclosure, a non-transitory computer-readable medium having program code recorded thereon. The program code includes code to identify, by a base station, a PRI field codepoint that indicates to perform PUCCH repetition within a slot position using a single PUCCH resource or multiple PUCCH resources; transmit, by the base station, DCI including the PRI field codepoint; and receive, by the base station, PUCCH repetition within the slot position using the multiple PUCCH resources.

In an additional aspect of the disclosure, an apparatus configured for wireless communication is disclosed. The apparatus includes at least one processor, and a memory coupled to the processor. The processor is configured to identify, by a base station, a PRI field codepoint that indicates to perform PUCCH repetition within a slot position using a single PUCCH resource or multiple PUCCH resources; transmit, by the base station, DCI including the PRI field codepoint; and receive, by the base station, PUCCH repetition within the slot position using the multiple PUCCH resources.

In an additional aspect of the disclosure, an apparatus configured for wireless communication includes means for identifying, by a base station, a PRI field codepoint that indicates to transmit a PUCCH repetition within a slot position using a single PUCCH resource or transmit multiple PUCCH repetitions within a slot position using multiple PUCCH resources; means for transmitting, by the base station, DCI including the PRI field codepoint; and means for receiving, by the base station, multiple PUCCH repetitions within a slot position using multiple PUCCH resources.

In an additional aspect of the disclosure, a non-transitory computer-readable medium having program code recorded thereon. The program code includes code to identify, by a base station, a PRI field codepoint that indicates to transmit a PUCCH repetition within a slot position using a single PUCCH resource or transmit multiple PUCCH repetitions within a slot position using multiple PUCCH resources; transmit, by the base station, DCI including the PRI field codepoint; and receive, by the base station, multiple PUCCH repetitions within a slot position using multiple PUCCH resources.

In an additional aspect of the disclosure, an apparatus configured for wireless communication is disclosed. The apparatus includes at least one processor, and a memory coupled to the processor. The processor is configured to identify, by a base station, a PRI field codepoint that indicates to transmit a PUCCH repetition within a slot position using a single PUCCH resource or transmit multiple PUCCH repetitions within a slot position using multiple PUCCH resources; transmit, by the base station, DCI including the PRI field codepoint; and receive, by the base station, multiple PUCCH repetitions within a slot position using multiple PUCCH resources.

In an additional aspect of the disclosure, an apparatus configured for wireless communication includes means for identifying, by a base station, a PRI field codepoint that indicates to perform a mapping of the PRI field codepoint to a set of one or more interpreted PRI values; means for transmitting, by the base station, DCI including the PRI field codepoint; and means for receiving, by the base station, PUCCH repetition within a slot position using multiple PUCCH resources corresponding to the one or more interpreted PRI values.

In an additional aspect of the disclosure, a non-transitory computer-readable medium having program code recorded thereon. The program code includes code to identify, by a base station, a PRI field codepoint that indicates to perform a mapping of the PRI field codepoint to a set of one or more interpreted PRI values; transmit, by the base station, DCI including the PRI field codepoint; and receive, by the base station, PUCCH repetition within a slot position using multiple PUCCH resources corresponding to the one or more interpreted PRI values.

In an additional aspect of the disclosure, an apparatus configured for wireless communication is disclosed. The apparatus includes at least one processor, and a memory coupled to the processor. The processor is configured to identify, by a base station, a PRI field codepoint that indicates to perform a mapping of the PRI field codepoint to a set of one or more interpreted PRI values; transmit, by the base station, DCI including the PRI field codepoint; and receive, by the base station, PUCCH repetition within a slot position using multiple PUCCH resources corresponding to the one or more interpreted PRI values.

In an additional aspect of the disclosure, an apparatus configured for wireless communication includes means for identifying, by the base station, a PRI field codepoint that maps to a set of one or more interpreted PRI values; means for transmitting, by the base station, DCI including the PRI field codepoint; and means for receiving, by the base station, PUCCH repetition within a slot position using multiple PUCCH resources corresponding to the one or more interpreted PRI values.

In an additional aspect of the disclosure, a non-transitory computer-readable medium having program code recorded thereon. The program code includes code to identify, by the base station, a PRI field codepoint that maps to a set of one or more interpreted PRI values; transmit, by the base station, DCI including the PRI field codepoint; and receive, by the base station, PUCCH repetition within a slot position using multiple PUCCH resources corresponding to the one or more interpreted PRI values.

In an additional aspect of the disclosure, an apparatus configured for wireless communication is disclosed. The apparatus includes at least one processor, and a memory coupled to the processor. The processor is configured to identify, by the base station, a PRI field codepoint that maps to a set of one or more interpreted PRI values; transmit, by the base station, DCI including the PRI field codepoint; and receive, by the base station, PUCCH repetition within a slot position using multiple PUCCH resources corresponding to the one or more interpreted PRI values.

In an additional aspect of the disclosure, an apparatus configured for wireless communication includes means for generating, by a base station, an RRC configuration that includes data that indicates whether to transmit multiple PUCCH repetitions using a single PUCCH resource or multiple PUCCH resources; means for transmitting, by the base station, the RRC configuration; and means for receiving, by the base station, the multiple PUCCH repetitions within a slot position using the multiple PUCCH resources.

In an additional aspect of the disclosure, a non-transitory computer-readable medium having program code recorded thereon. The program code includes code to generate, by a base station, an RRC configuration that includes data that indicates whether to transmit multiple PUCCH repetitions using a single PUCCH resource or multiple PUCCH resources; transmit, by the base station, the RRC configuration; and receive, by the base station, the multiple PUCCH repetitions within a slot position using the multiple PUCCH resources.

In an additional aspect of the disclosure, an apparatus configured for wireless communication is disclosed. The apparatus includes at least one processor, and a memory coupled to the processor. The processor is configured to generate, by a base station, an RRC configuration that includes data that indicates whether to transmit multiple PUCCH repetitions using a single PUCCH resource or multiple PUCCH resources; transmit, by the base station, the RRC configuration; and receive, by the base station, the multiple PUCCH repetitions within a slot position using the multiple PUCCH resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a block diagram illustrating example blocks executed by a UE configured according to an aspect of the present disclosure.

FIG. 9 is a block diagram illustrating example blocks executed by a UE configured according to an aspect of the present disclosure.

FIG. 10 is a block diagram illustrating example blocks executed by a UE configured according to an aspect of the present disclosure.

FIG. 11 is a block diagram illustrating example blocks executed by a UE configured according to an aspect of the present disclosure.

FIG. 12 is a block diagram illustrating example blocks executed by a UE configured according to an aspect of the present disclosure.

FIG. 13 is a block diagram illustrating example blocks executed by a base station configured according to an aspect of the present disclosure.

FIG. 14 is a block diagram illustrating example blocks executed by a base station configured according to an aspect of the present disclosure.

FIG. 15 is a block diagram illustrating example blocks executed by a base station configured according to an aspect of the present disclosure.

FIG. 16 is a block diagram illustrating example blocks executed by a base station configured according to an aspect of the present disclosure.

FIG. 17 is a block diagram illustrating example blocks executed by a base station configured according to an aspect of the present disclosure.

DETAILED DESCRIPTION

Figure 1:
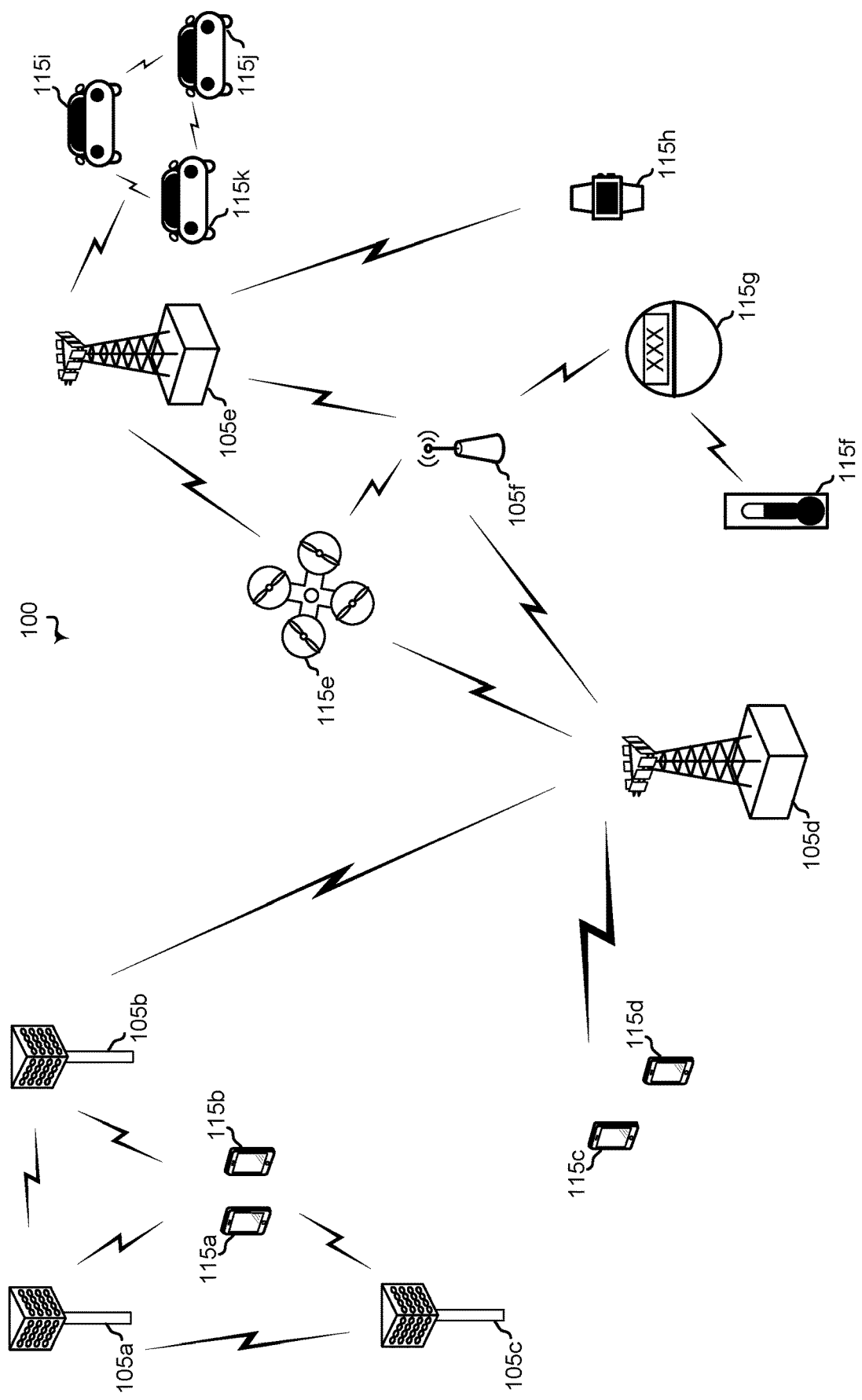
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
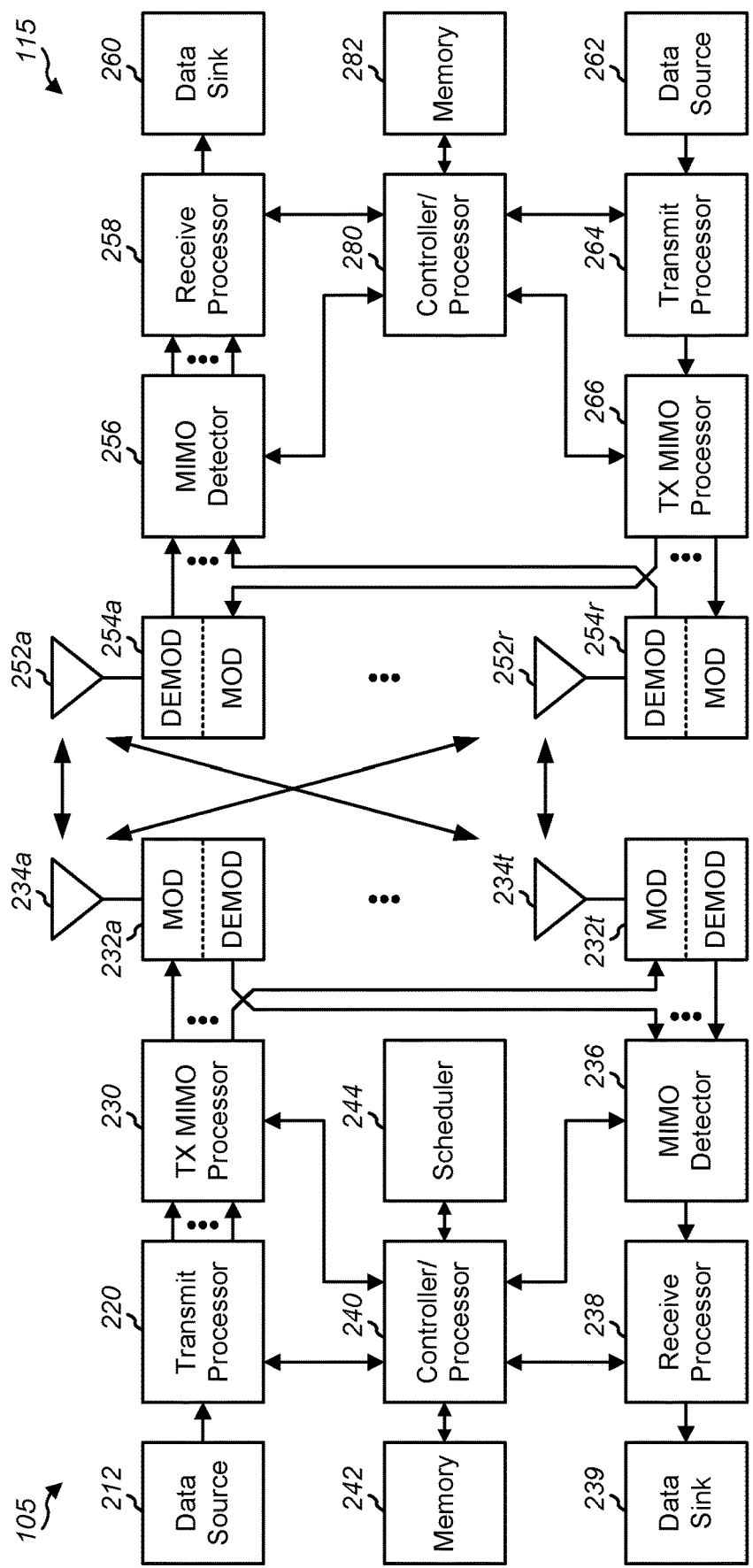
FIG. 2 is a block diagram illustrating a design of a base station and a user equipment (UE) configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 or other processors and modules at the base station 105 may perform or direct the execution of various processes for the techniques described herein. The controllers/processor 280 or other processors and modules at the UE 115 may also perform or direct the execution of the functional blocks illustrated in FIGS. 8-19, or other processes for the techniques described herein. The memories 242 and 282 may store data and program codes for the base station 105 and the UE 115, respectively. A scheduler 244 may schedule UEs for data transmission on the downlink or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
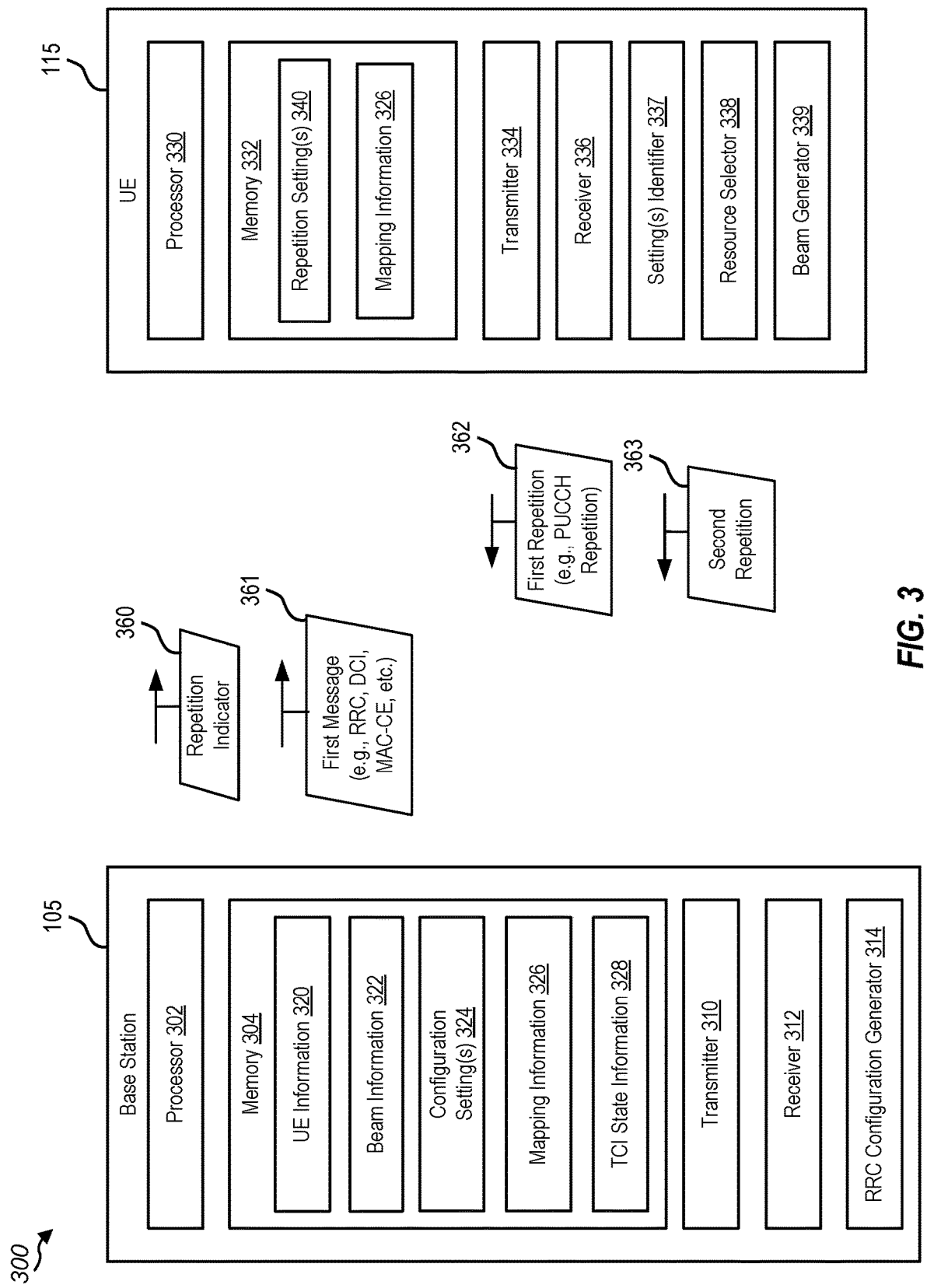
FIG. 3 is a diagram illustrating wireless communication for physical uplink control channel (PUCCH) repetition.

FIG. 3 illustrates an example of a wireless communications system 300 that supports physical uplink control channel (PUCCH) repetition in accordance with aspects of the present disclosure. In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both. For example, base station 105 (e.g., a network entity) may include or correspond to a first base station (e.g., a first network entity), such as an eNB, and a second base station (e.g., a second network entity), such as a gNB.

Base station 105 includes processor 302, memory 304, transmitter 310, receiver 312, and a radio resource control (RRC) configuration generator 314. Processor 302 may be configured to execute instructions stores at memory 304 to perform the operations described herein. In some implementations, processor 302 includes or corresponds to controller/processor 240, and memory 304 includes or corresponds to memory 242. Memory 304 may also be configured to store UE information 320, beam information 322, one or more configuration settings 324, mapping information 326, and transmission configuration indicator (TCI) state information 328, as further described herein.

For example, the UE information 320 may indicate one or more UEs in communication with base station 105. In some implementations, UE information 320 may include or indicate, for a UE, a PUCCH repetition mode (e.g., scheme), RRC configuration information (e.g., 324), one or more beams (e.g., 322), such as an activated beam for a PUCCH source, one or more TCI states, or a combination thereof.

Beam information 322 may identify one or more beams or a set of indices corresponding to one or more beams. Configuration settings 324 may include one or more settings for PUCCH repetition, such as a repetition mode. To illustrate, configuration settings 324 may include one or more PUCCH resources. In some implementations, configuration settings 324 may include a PUCCH resource set, and each set can include up to eight PUCCH resources, as an illustrative, non-limiting example. As an exception, a first (e.g., initial) set may include up to thirty-two PUCCH resources while other sets may only include up to eight PUCCH resources. Additionally, or alternatively, and one or more sets can be configured (e.g., via RRC configuration). For example, up to four sets may be configured (e.g., via RRC configuration), as an illustrative, non-limiting example. Which set to use may depend on the payload size of uplink control information (UCI).

For a PUCCH resource, a set of RBs/symbols and a PUCCH format are indicated and configured per PUCCH resource (e.g., via RRC configuration). For example, PUCCH spatial relation information ("PUCCH-SpatialRelationInfo") may be used indicate the beam to use for a PUCCH resource. Additionally, or alternatively, a set of indices (corresponding to a set of one or more beams—e.g., each index can point to SSB/CSI-RS/SRS for reference signal) is configured by RRC for all PUCCH resources. For a given PUCCH resource, one index (e.g., beam) can be activated by MAC-CE. In some implementations, power control parameters are also included as part of PUCCH-SpatialRelationInfo.

In some implementations, memory 304 may include scheduling information for PUCCH included in the downlink control information (DCI) (DCI format 1_0 or 1_1). The memory 304 may include or track a PDSCH-to-HARQ feedback timing indicator field (a.k.a. K1 value). The K1 value may include an index pointing a value of DL data to UL A/N in unit of slots from a configured set or a default set, such as {1, 2, 3, 4, 5, 6, 7, 8}. The index may indicate or be used to determine which slot a HARQ-A for the scheduled PDSCH is to be to be transmitted on PUCCH. Additionally, configuration settings 324 may include a PUCCH resource indicator (PRI). The PRI may include an index that is used to determine a PUCCH resource within a PUCCH resource set. In some implementations, a PRI in a last DCI is considered (among all the DCIs that have a value of K1 indicating a same slot for PUCCH transmission).

Figures 4, 5:
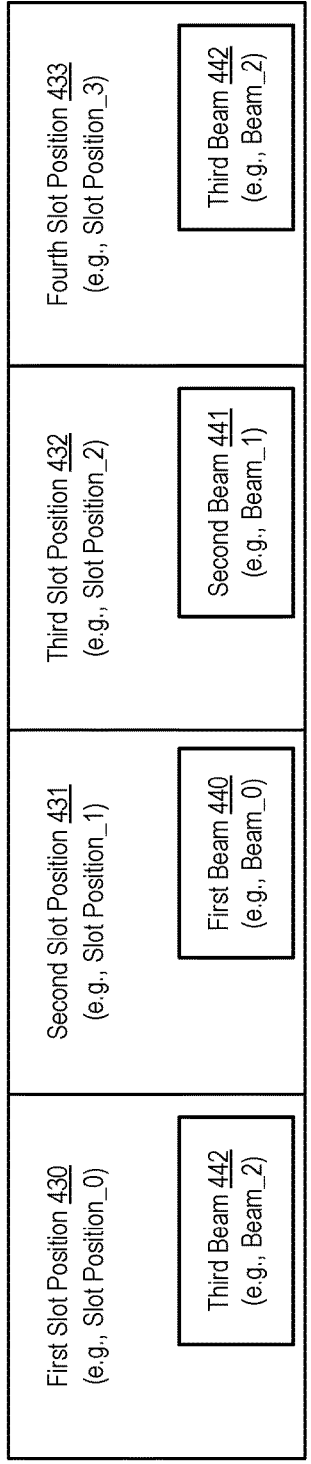
FIG. 4 is a block diagram illustrating an example of multiple slot positions using during which multiple beams are used.
FIG. 5 is a diagram illustrating an example of a mapping data structure to map a physical uplink control channel resource indicator (PRI) field codepoint to an interpreted PRI value.

Mapping information 326 information may include one or more data structures for mapping a PRI field codepoint to one or more interpreted PRI values, as described further herein at least with reference to FIG. 5. TCI state information 328 may a TCI code point which, in DCI, can correspond to one or two TCI states.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, base station 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of base station 105 described with reference to FIG. 2.

RRC configuration generator 314 is configured to generate the one or more RRC configuration settings. For example, RRC configuration generator 314 may generate one or more RRC configuration settings based on UE information 320, beam information 322, configuration setting 324, mapping information 326, TCI state information 328, or a combination thereof.

UE 115 includes processor 330, memory 332, transmitter 334, receiver 336, a settings identifier 337, a resource selector 338, and a beam generator 339. Processor 330 may be configured to execute instructions stored at memory 332 to perform the operations described herein. In some implementations, processor 330 includes or corresponds to controller/processor 280, and memory 332 includes or corresponds to memory 282. Memory 332 may also be configured to store one or more repetition settings 340 and mapping information 326. The one or more repetition settings 340 may be used by UE 115 to perform PUCCH repetition one or more slot position, such as one or more slots, one or more sub-slots, or a combination thereof. In some implementations, the repetition settings 340 may include or indicate one or more repetition modes.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, UE 115 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of UE 115 described with reference to FIG. 2.

Setting(s) identifier 337 may receive one or more messages from base station 105 and determine the one or more repetition settings 340, as described herein. Resource selector 338 is configure to select one or more PUCCH resources based on the one or more repetition settings 340. Beam generator 339 is configured to generate or use one or more beams based on the one or more repetition settings.

During operation of wireless communications system 300, base station 105 may send a repetition indicator 360 to UE 115. Repetition indicator 360 may indicate whether or not UE 115 is to perform PUCCH repetition, whether UE 115 is to perform a single repetition per slot position or multiple repetitions for a slot position, a PUCCH repetition mode (e.g., a PUCCH repetition scheme), or a combination thereof. In some implementations, the repetition indicator 360 may indicate a repetition mode of the UE 115.

Base station 105 may send a first message 361 to UE 115. First message 361 may include or indicate UE information 320, beam information 322, configuration settings 324, TCI state information 328, or a combination thereof. In some implementations, first message 361 may include or correspond to repetition indicator 360. First message 361 may include a RRC (e.g., one or more RRCs), a DCI, or a MAC-CE, as illustrative, non-limiting examples. In some implementations, first message 361 includes one or more RCCs generated by RRC configuration generator 314. For example, RRC configuration generator 314 may generate a first RRC for PUCCH-SpatialRelationInfo that indicates a set of indices for one or more resources (e.g., one or more PUCCH resources). As another example, RRC configuration generator 314 may generate a second RRC for PUCCH-FormatConfig that indicates a number of slots (e.g., a value of a "nrofSlots" field). As another example, RRC configuration generator 314 may generate a third RRC for PUCCH-Config (in Rel. 15) that indicates "spatialRelationInfoToAddModList" for all PUCCH resources. It is noted that the second RRC (for PUCCH-FormatConfig (together with "nrofSlots")) may be different from the third RRC (for PUCCH-Config (in Rel. 15)) that indicates "spatialRelationInfoToAddModList" for all PUCCH resources.

UE 115 receives repetition indicator 360, first message 361, or both, and settings identifier 337 processes the repetition indicator 360, first message 361, or both to determine repetition settings 340 (e.g., PUCCH repetition settings). For example, settings identifier 337 may process the repetition indicator 360, first message 361, or both, according to a repetition mode (e.g., a repetition scheme), such as a selected mode of multiple repetition modes. In some implementations, the mode may be indicated by or selected based on repetition indicator 360. After repetition settings 340 are determined, UE 115 may perform repetition—e.g., transmit one or more PUCCH repetitions—based on the repetition settings 340. For example, resource selector 338 may select, based on repetition settings 340, one or more resources, such as one or more PUCCH resources. Additionally, or alternatively, beam generator 339 may select, based on repetition settings 340, one or more beams. To illustrate, resource selector 338 may select a first resource (e.g., a first PUCCH resource) for a first repetition 362, and beam generator 339 may select a first beam for the first resource. As another example, resource selector 338 may select a second resource (e.g., a second PUCCH resource) for a second repetition 363, and beam generator 339 may select a second beam (different from the first beam) for the second resource.

UE 115 transmits the first repetition 362, the second repetition 363, or both, based on the repetition settings 340. To illustrate, UE 115 may transmit first repetition 362 and second repetition during one or more slot positions. The one or more slot positions may include or correspond to one or more slots, one or more sub-slots, or a combination thereof. As an example, first repetition 362 (for a first resource) is transmitted using a first beam of multiple beams during a first slot position and second repetition (for a second resource) is transmitting using a second beam of multiple beams during a second slot positions. As another example, first repetition 362 (for a first resource) is transmitted using a first beam of multiple beams during a first slot position and second repetition (for a second resource) is transmitted using a second beam of multiple beams during the first slot positions.

Base station 105 may receive first repetition 362, second repetition 363, or both. Base station 105 may process first repetition 362, second repetition 363, or both, based at least on configuration settings 325.

In some implementations, UE 115 is configured with PUCCH repetition through nrofSlots for a PUCCH format, and a PUCCH resource is used. In such implementations, UE 115 may not use the activated PUCCH-SpatialRelationInfo for that PUCCH resource.

To illustrate, according to a first mode of operation (e.g., a first scheme or a first option), UE 115 (e.g., 337) identifies a set of indices configured by RRC for PUCCH-SpatialRelationInfo to be used (configured in IE PUCCH-Config for all the PUCCH resources in a BWP). During a first slot position, UE 115 uses a first beam (e.g., a lowest ID: PUCCH-SpatialRelationInfoId) to transmit first repetition 362; during a second slot position, UE uses a second beam (e.g., a next ID) to transmit second repetition 363; and so on. In some implementations, UE 115 selects between the first option and Rel. 15 behavior in which each repetition is sent using the same beam.

In some implementations of the first option, the first repetition 362 (e.g., an initial transmitted repetition), may use the activated PUCCH-SpatialRelationInfo for the resource (e.g., the PUCCH resource) that is used. The activated PUCCH-SpatialRlationInfo for the resource may be indicated in a MAC-CE. For one or more remaining repetitions (e.g., repetition(s) following the initial transmitted repetition), the set of indices configured by RRC for PUCCH-SpatialRelationInfo may be used.

Referring to FIG. 4, an example of the first option is shown and generally designated 400. Example 400 shows multiple slot positions, such as a first slot position 430 (e.g., Slot Position_0), a second slot position 431 (e.g., Slot Position_1), a third slot position 432 (e.g., Slot Position_2), and a fourth slot position 433 (e.g., Slot Position_3). Although four slot positions are shown, this is not to be considered limiting and fewer than or more than four slot positions may be present. A slot position may include a slot (e.g., an entirety of a slot) or a sub-slot. As an example of sub-slots, each of the first slot position 430 and second slot position 431 may be sub-slots of the same slot.

As shown in FIG. 4, a number of slot positions is equal to four. For example, in some implementations, nrofSlots (or "nrofSubslots") is equal to four. With reference to example 400, in PUCCH-Config, "spatialRelationInfoToAddMod-List" contains three beams (IDs=0, 1, 2), but for pucch-ResourceId=x, beam_2 (i.e. PUCCH-SpatialRelationInfold=2) is activated through MAC-CE. Stated in another manner, three beams are available for all resources (e.g., PUCCH resources) and, for a resource x, beam_2 is activated based on a MAC-CE. As shown in FIG. 4, the three beam include a first beam 440 (e.g., beam_0), a second beam 441 (e.g., beam_1), and a third beam 442 (e.g., beam_2). In FIG. 4, repetition in the same resource (e.g., the same PUCCH resource)—i.e., resource x—is shown. According to the first mode, first slot position 430 uses third beam 442 (e.g., beam_2) for repetition because third beam 442 (e.g., beam_2) is the activated beam for resource x based on the MAC-CE. After the first slot position 430, the set of three beams are used (e.g., cycled through) for the remaining slot positions. To illustrate, for repetition of resource x, first beam 440 (e.g., beam_0) is used for second slot position 431; second beam 441 (e.g., beam_1) is used for third slot position 431; and third beam 442 (e.g., beam_2) is used for fourth slot position 443.

As shown in FIG. 4, for the remaining repetitions (after the initial repetition), the beam (e.g., third beam 442 (e.g., beam_2)—the activated beam) for the initial slot position is used again in the set of beams (440, 441, 442). In other implementations, the beam (e.g., third beam 442 (e.g., beam_2)—the activated beam) for the initial slot position may not be used again for the remaining repetitions (after the initial repetition). In such an implementation, first beam 440 (e.g., beam_0) is used for second slot position 431; second beam 441 (e.g., beam_1) is used for third slot position 432; and first beam 440 (e.g., beam_0) is used for fourth slot position 443. It is noted that if a number of beams in PUCCH-SpatialRelationInfold is less than a number of slot positions (e.g., "nrofSlots" or "nrofsubSlots"), after going through the set, the beams available for use are cycled through one or more times, as needed, until the number of slot positions is completed.

According to a second mode of operation (e.g., a second scheme or a second option), UE 115 (e.g., 337) identifies a set of one or more beams (e.g., a set of PUCCH-SpatialRelationInfold for repetition beams) based on or using a second RRC for PUCCH-FormatConfig. For example, in the second mode, a number of slot positions and a set of beams for repetition may be defined by PUCCH-FormatConfig for each of one or more formats. In some implementations, the set of beams can have a same number of beams as number of slot positions—i.e., a one-to-one correspondence between beams and slot positions. It is noted that if a number of beams in PUCCH-SpatialRelationInfold is less than a number of slot positions (e.g., "nrofSlots" or "nrofsubSlots"), after going through the set, the beams available for use are cycled through one or more times, as needed, until the number of slot positions is completed. In some implementations of the second mode, if the set of beams includes a single beam, the resource (e.g., the PUCCH resource) may switch to operation according to Rel. 15 in which, for the resource, the same beam is used for repetition for each slot position.

It is noted that each of the first mode and the second mode may be used for slots (inter-slot repetition) and subslots (intra-slot repetition). For example, a set of beams may be cycled through on a per slot basis or on a per subslot basis. As another example, when a set of slot positions includes two or more slots each with multiple subslots, the set of beams may be cycled through per subslot. As another example, when a set of slot positions includes two or more slots each with multiple subslots, the set of beams may be cycled through per slot, where a beam is used for multiple subslots for its correspond slot.

In some implementations, UE 115 may transmit, for a PUCCH resource, a first PUCCH repetition (e.g., 362) for a first slot position and a second PUCCH repetition (e.g., 363) for a second slot position. For example, the first PUCCH repetition may be transmitted using a second beam of multiple beams for the first slot position of the multiple slot positions. The multiple slot positions may include multiple slots or multiple sub-slots of a slot. In some implementations, such as when UE 115 is configured according to the first mode, UE 115 receives an RRC configuration (e.g., 361) including a PUCCH resource. The UE 115 may also identify a set of indices for one or more PUCCH resources. Each index of the set of indices corresponding to a different beam of multiple beams. For example, UE 115 (e.g., 337) identifies a set of indices configured by RRC for PUCCH-SpatialRelationInfo to be used (configured in IE PUCCH-Config for all the PUCCH resources in a BWP). Alternatively, in other implementations, such as when UE 115 is configured according to the second mode, UE 115 may identify a set of indices for one PUCCH resource (e.g., a single resource), where each index of the set of indices corresponding to a different beam of multiple beams. For example, UE 115 may identify the set of indices defined by PUCCH-FormatConfig for each of one or more formats.

According to a third mode of operation (e.g., a third scheme or a third option), UE 115 may identify one or more resources (e.g., PUCCH resources) based on PRI field codepoint in a DCI (e.g., 361). For example, the PRI field codepoint may indicate (e.g., point to) one PRI value or two PRI values. A PRI value may indicate a PUCCH resource within a PUCCH resource set. The PRI field codepoint may be mapped to one or more "interpreted" PRI values using mapping information 326. The mapping between PRI field codepoint in the DCI and the one or more interpreted PRI values can be configured based on or responsive to repetition indicator 360 or based on first message 361, such as responsive to an RRC configuration or a MAC-CE. When multiple PRI values are interpreted, multiple resources (e.g., PUCCH resources) may be identified for repetition during a slot position. For example, UE 115 may use a first PUCCH resource of the multiple PUCCH resources to transmit a first PUCCH repetition (e.g., 362) of the multiple PUCCH repetitions within a slot position and use a second PUCCH resource of the multiple PUCCH resources to transmit, a second PUCCH repetition (e.g., 363) of the multiple PUCCH repetitions within the same slot position (e.g., slot or subslot).

Referring to FIG. 5, an example of a data structure for mapping a PRI field codepoint 502 to one or more interpreted PRI values 520 is shown and designated 500. Each PRI field codepoint is listed as an integer with a corresponding binary representation in a parenthetical. As shown, for the case of one interpreted PRI value or two interpreted PRI values, the first PRI value is the same as the codepoint in the DCI. Accordingly, in such an implementation, only the second interpreted PRI is configured through RRC or activated through MAC-CE. Additionally, it is noted that the second interpreted PRI for some of the codepoints can be "empty", i.e., that codepoint only indicates one PRI value. When there are two interpreted PRI values, the corresponding PUCCH resources can have different MAC-CE activated PUCCH-SpatialRelationInfo's. For example, the first interpreted value corresponds to a first PUCCH resource using a first beam and the second interpreted value corresponds to a second PUCCH resource using a second beam. In other implementations, the first PRI value is different from the codepoint in the DCI, and the first interpreted value is configured through RRC or activated through MAC-CE and the second interpreted value is configured through RRC or activated through MAC-CE. Although data structure 500 has been described as mapping a PRI field codepoint to one or two interpreted PRI values, in other implementations, the data structure 500 may be configured to map the PRI field codepoint to more than two interpreted PRI values.

According to a fourth mode of operation (e.g., a fourth scheme or a fourth option), UE 115 also uses PRI field codepoints for determining repetition (e.g., PUCCH repetition). In some implementations, the fourth mode and the third mode are part of the same mode of operation. During the fourth mode, the UE 115 receives from a network (e.g., base station 105) a DCI scheduling PDSCH and a PRI field can be used indicate whether to use two PUCCH resources to repeat the PUCCH content (HARQ-Ack codebook along with other UCIs in the case of UCI multiplexing). For example, the DCI (e.g., 361) may include a Downlink (DL) DCI scheduling a Physical Downlink Shared Channel (PDSCH), and the PUCCH repetition includes a Hybrid Automatic Repeat Request (HARQ)-ACK codebook.

Figure 6:
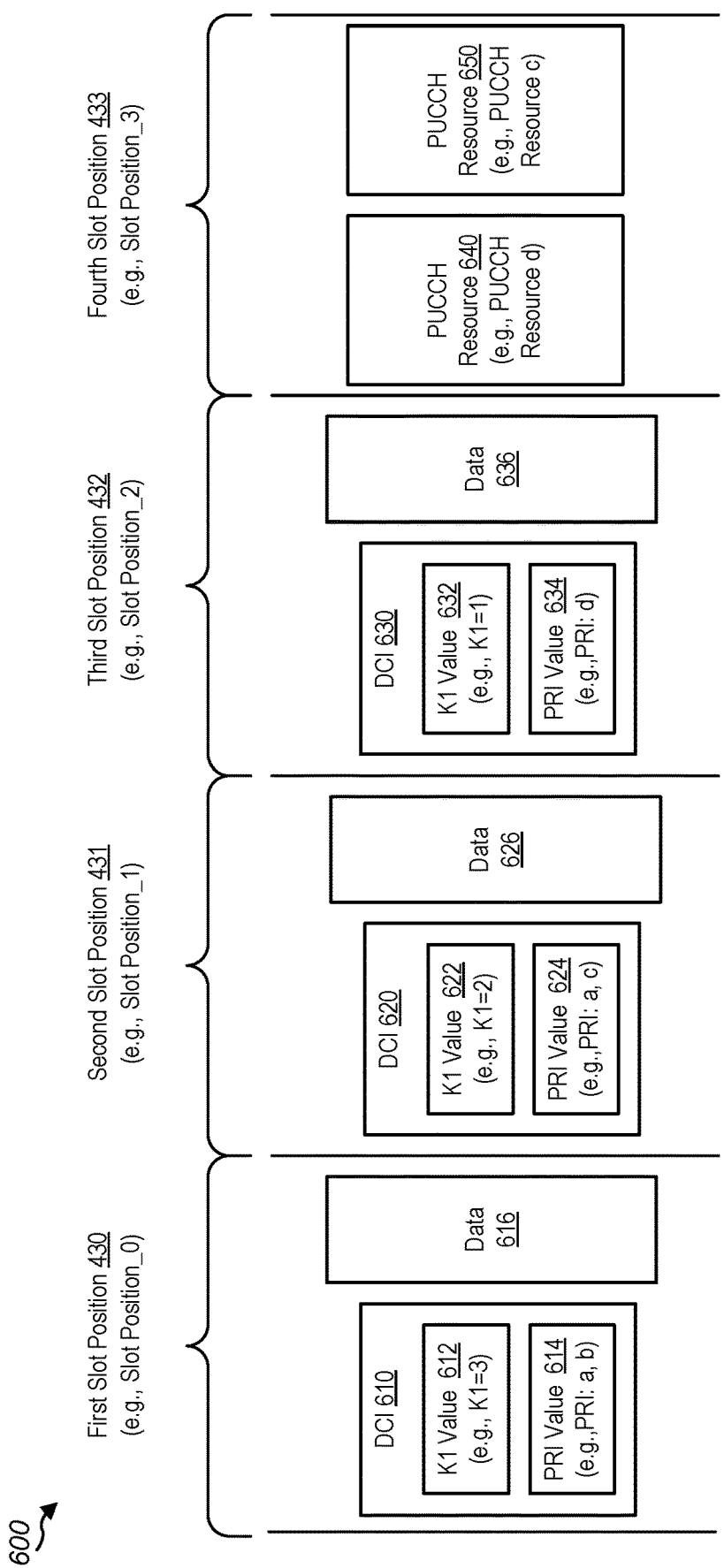
FIG. 6 is block diagram to illustrate downlink control information (DCI) scheduling physical downlink shared channel (PDSCH).

Referring to FIG. 6, an example of the fourth mode is shown and designated 600. As shown, the example includes slot positions 430-433. During each of the slot positions 430-432, a DCI and data are communicated. For example, during first slot position 430, a first DCI 610 and data 616 are communication; during second slot position 431, a second DCI 620 and second data 626; and during third slot position 432, third DCI 630 and third data is communicated. Each DCI may have a correspond K1 value and may indicate one or more PRI values 624. For example, first DCI 610 includes a first K1 value 612 (e.g., K1=3) and indicates a first set of PRI values 614 (e.g., PRI: a, b); second DCI 620 includes a second K1 value 622 (e.g., K1=2) and indicates a second set of PRI values 624 (e.g., PRI: a, c); and third DCI 630 includes a third K1 value 632 (e.g., K1=1) and indicates a third set of PRI values 634. In some implementations, UE 155 receives each of DCIs 610, 620, 630. During fourth slot position 433, UE 115 transmits PUCCH resource 640 and PUCCH resource 650, as described herein. In some implementations, one or more of the DCIs 610, 620, 630 indicate more than two PRI values.

During the fourth mode, UE 115 receives the DCIs 610, 620, 630 and identifies a set of DCIs in which each DCI has the same HARQ feedback timing indicator field (e.g., K1 value) indicating the same slot position for PUCCH transmission of HARQ-ACK feedback. As shown in FIG. 6, each of the DCIs 610, 620, 630 indicates fourth slot position 433 for PUCCH transmission of HARQ-ACK feedback.

In a first implementation of the fourth mode, UE 115 identifies a last detected DCI (e.g., 630) of the set of DCIs 610, 620, 630. UE 115 determines whether to perform PUCCH repetition if the corresponding PRI field codepoint (e.g., 634) of the last detected DCI (e.g., 630) indicates multiple PRI values. As shown, third DCI 630 indicates PRI value 634 as PRI: d—a single PRI. Since PRI value 634 indicates a single PRI value, UE 315 would use PUCCH resource 640 (e.g., PUCCH resource d corresponding to PRI value d) to send HARQ-ACK feedback during fourth slot position 433. In such an implementation, UE 115 would not use PUCCH resource 650 (e.g., PUCCH resource c). Alternatively, if third DCI 630 indicated PRI values d and c, UE 115 would perform repetition during fourth slot position 433 and would use each of PUCCH resource 640 (e.g., PUCCH resource d corresponding to PRI value d) and PUCCH resource 650 (e.g., PUCCH resource c corresponding to PRI value c) to send HARQ-ACK feedback during fourth slot position 433.

In a second implementation of the fourth mode, UE 115 identifies a last detected DCI (e.g., 630) of the set of DCIs 610, 620, 630. UE 115 determines whether to perform PUCCH repetition if at least one DCI of the set of DCI 610, 620, 630 has a corresponding PRI field codepoint that indicates multiple PRI values. As shown, both first DCI 610 and second DCI indicate multiple PRI values, so UE 115 determines to perform repetition. If the last detected DCI (e.g., 630) indicated multiple PRI values, UE 115 would use the PRI values indicated by third DCI 630. Alternatively, if the last detected DCI (e.g., 630) indicates a single PRI value as shown, UE 115 perform repetition using a first PUCCH resource 640 corresponding to the single PRI value (e.g., PUCCH resource d) and using a second PUCCH resource 650 (e.g., resource c) corresponding to a most recently received DCI (e.g., 620) of the at least one received DCI (e.g., 610, 620) that includes the value of the PRI field codepoint corresponding to the multiple PRI values. It is noted that if second DCI 620 indicated a single PRI value, the most recently received DCI of the at least one received DCI (e.g., 610) that includes the value of the PRI field codepoint corresponding to the multiple PRI values is the first DCI 610 and, therefore, the UE 115 would use PUCCH resource b as the second PUCCH resource 650.

In some implementations, the fourth mode may be used based on a determination that a TCI filed in at least one DCI 610, 620, 630 points to two TCI states (PDSCH multi-TRP schemes SDM/FDM/TDM). In a particular implementation, the fourth mode may be used based on a determination that a TCI in each of the DCIs 610, 620, 630 (having the same HARQ feedback timing indicator field (e.g., K1 value) indicating the same slot position for PUCCH transmission of HARQ-ACK feedback) points to two TCI states. If at least one DCI does not have a TCI field that points to two TCI states, or alternatively, less than all of the DCIs a TCI that points to two TCI states, UE 115 may operate according to Rel. 15 behavior for the PRI value. Additionally, or alternatively, it is noted, that the fourth mode may be used with the third mode and a mapping data structure, such as data structure 500. Accordingly, the fourth mode may operate based on interpreted PRI values indicated by DCIs 610, 620 630.

In a third implementation of the fourth mode, UE 115 identifies a PRI value, such as an interpreted PRI value. UE selects a first interpreted PRI value as the PRI codepoint value and determines the first PUCCH resource (e.g., 640) for repetition based on the first interpreted PRI value. The UE determines whether to use an additional (e.g., second)

PUCCH resource based on one or more rules—e.g., one or more conditions. For example, UE may select the second PUCCH resource from among all the other PUCCH resources within a PUCCH resource set that: do not overlap with the first PUCCH resource; start after the first PUCCH resource; has a different MAC-CE activated PUCCH-SpatialRelationInfo than the first PUCCH resource; the corresponding PUCCH-SpatialRelationInfo has the same quasi co-located (QCL) source as the second TCI state; or a combination thereof. It is noted that the condition of the corresponding PUCCH-SpatialRelationInfo has the same QCL source as the second TCI state may only be applicable in the case that the TCI field in the DCI points to two TCI states. The fourth mode of operation or any of the implementations of the fourth mode described herein, can be RRC configuration.

Figure 7:
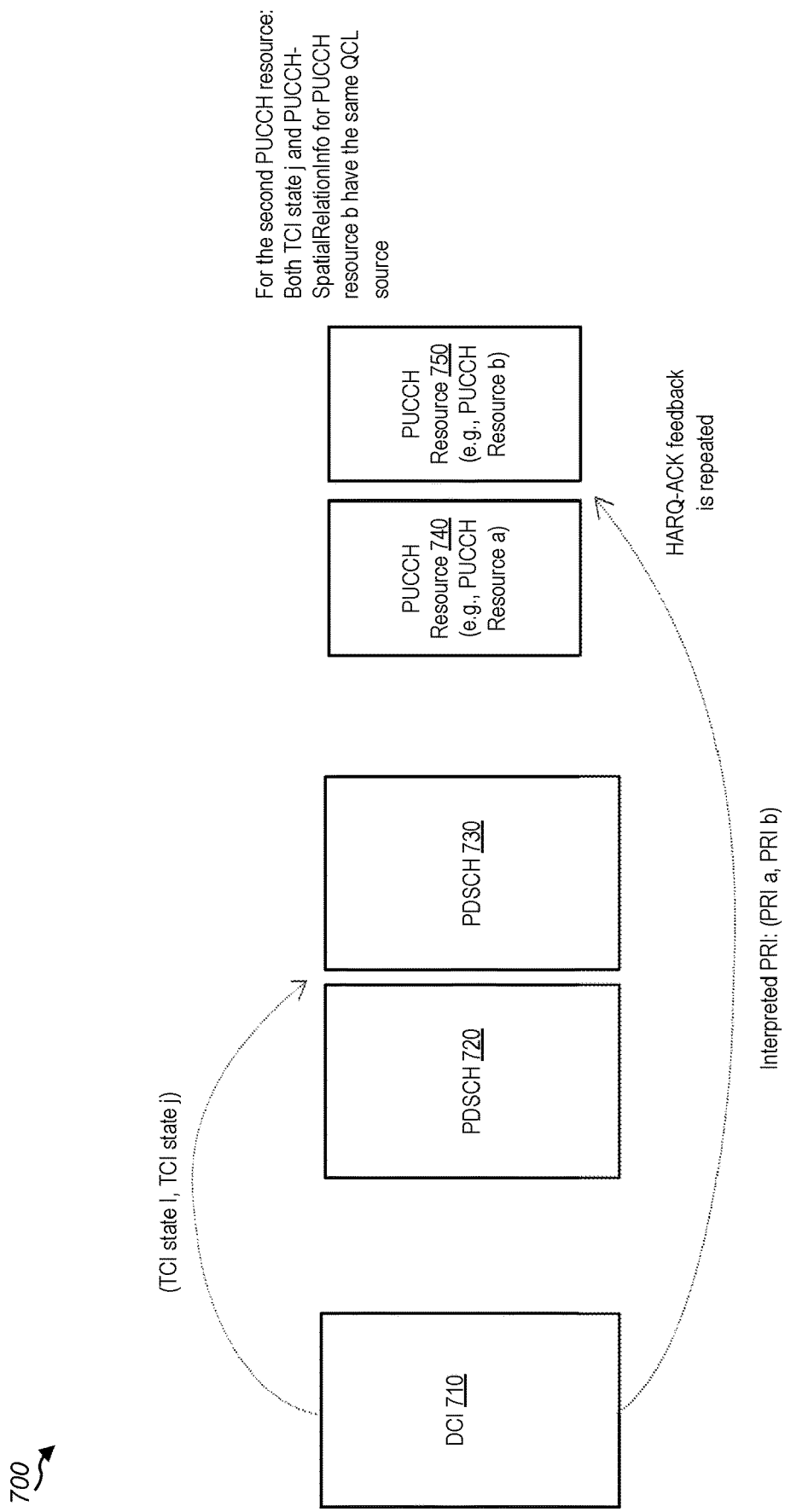
FIG. 7 is a block diagram illustrating an example of utilization of the transmission configuration indicator (TCI) field for PUCCH repetition.

Referring to FIG. 7, an example of the third implementation of the fourth mode is shown and designated 700. As shown, a DCI 710 (e.g., 361) includes two TCI states—TCI state i and TCI state j—and corresponds to PDSCH 720 and PDSCH 730. A PRI value codepoint (a) of DCI 710 is interpreted as PRI values a and b. UE 115 selects first interpreted PRI value for the first PUCCH resource 740 For the second PUCCH resource 750, UE 115 determines that the TCI state j and PUCCH SpatialRelationInfo for PUCCH resource b have the same QCL source. Based on those conditions, UE 115 selects the second PUCCH resource 750 based on PRI value b.

Thus, FIG. 3 describes PUCCH repetition. For example, a configuration may transmit multiple repetitions (e.g., 362, 363) using different resource or different beams. The multiple repetitions (e.g., 362, 363) may be transmitted during the same slot position or during different slot positions. Additionally, UE 115 may be configured to perform PUCCH repetition based on one or more modes. Each of the one or more modes provides greater flexibility for UE 115 to perform PUCCH repetition not realized by conventional systems. Accordingly, PUCCH repetitions are move likely to be received during dynamically changing network conditions as compared to conventional systems.

Figure 20:
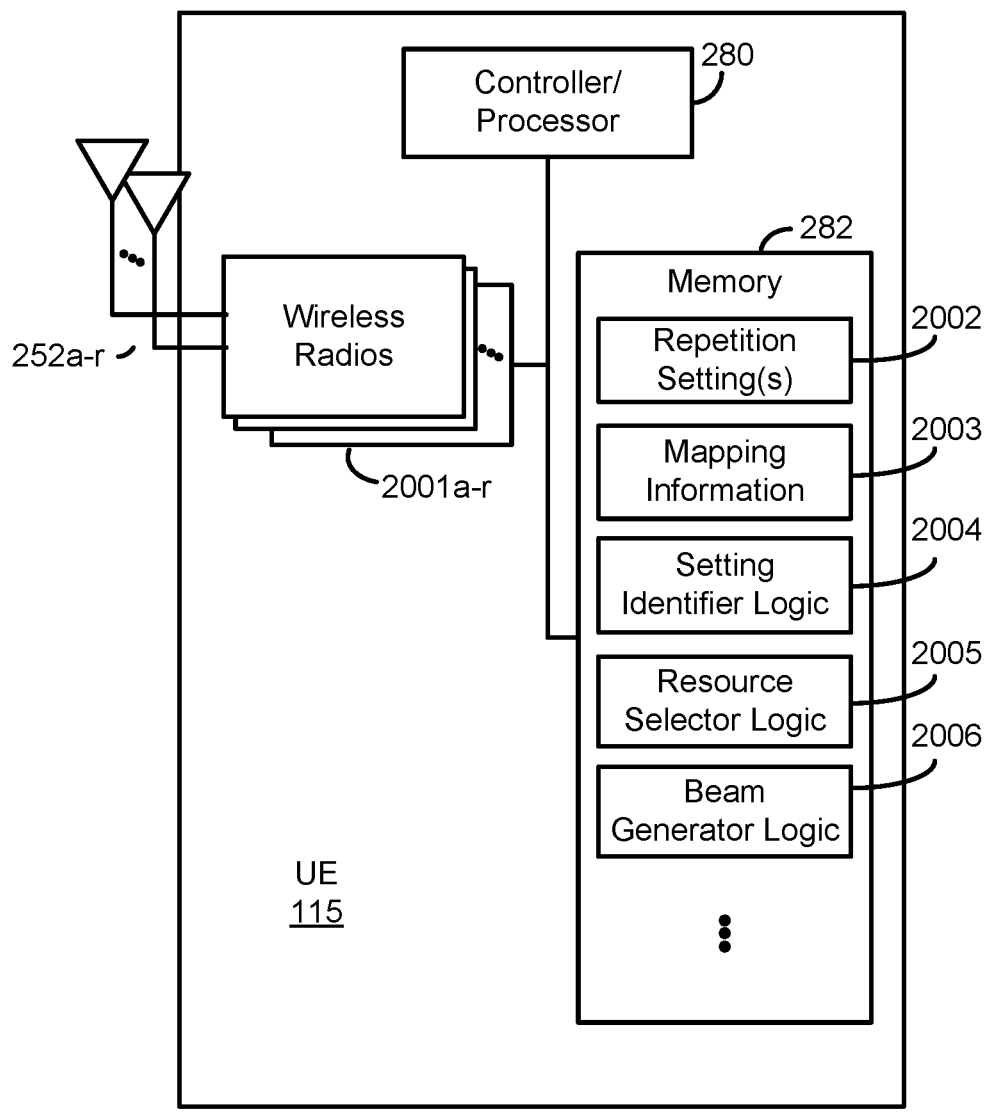
FIG. 20 is a block diagram conceptually illustrating a design of a UE configured to support PUCCH repetition.
Figure 21:
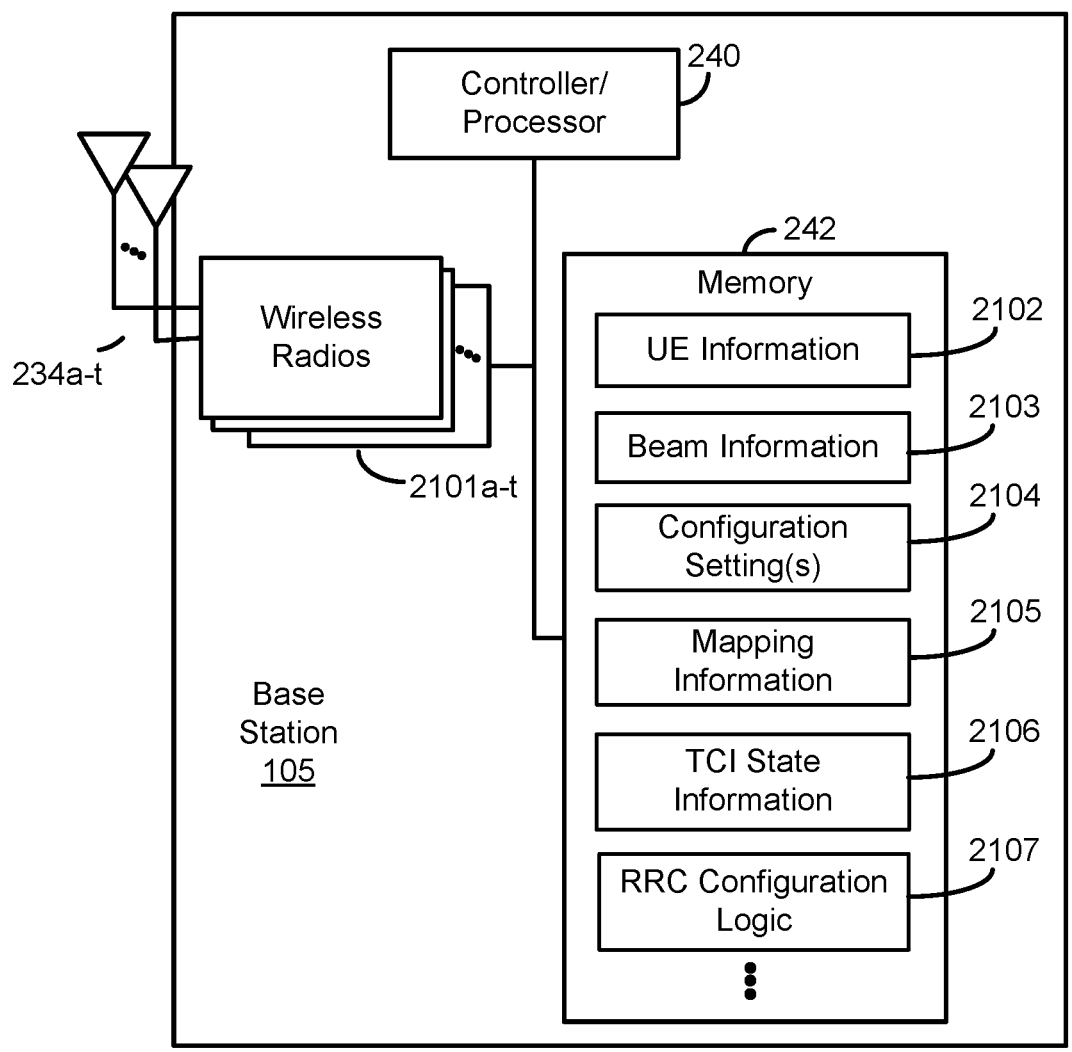
FIG. 21 is a block diagram conceptually illustrating a design of a base station configured to support PUCCH repetition.

FIGS. 8-12 are block diagrams illustrating example blocks executed by a UE configured according to an aspect of the present disclosure. The example blocks will also be described with respect to UE 115 as illustrated in FIG. 8. FIG. 20 is a block diagram illustrating UE 115 configured according to one aspect of the present disclosure. UE 115 includes the structure, hardware, and components as illustrated for UE 115 of FIG. 2 or 3. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 2001a-r and antennas 252a-r. Wireless radios 2001a-r includes various components and hardware, as illustrated in FIG. 2 for UE 115, including modulator/demodulators 254a-r, MIMO detector 256, receive processor 258, transmit processor 264, and TX MIMO processor 266. As shown, memory 282 may include repetition setting(s) 2002, mapping information 2003, setting identifier logic 2004, resource selector logic 2005, and beam generator logic 2006. Repetition setting(s) 2002 and mapping information 2003 may include or correspond to repetition setting(s) 340 and mapping information 326, respectively. Setting identifier logic 2004 may include or correspond to setting(s) identifier 337. Resource selector logic 2005 may include or correspond to resource selector 338. Beam generator logic 2006 may include or correspond to beam generator 339. In some aspects, setting identifier logic 2004, resource selector logic 2005, beam generator logic 2006, or a combination thereof, may include or correspond to processor(s) 280. UE 115 may receive signals from or transmit signal to a base station, such as base station 105 of FIG. 3 or base station 105 as illustrated in FIG. 21.

Referring to FIG. 8, at block 800, the UE receives an RRC configuration including a PUCCH resource. To illustrate, the UE may receive the RRC via wireless radios 2001a-r and antennas 252a-r. The RRC configuration may include or correspond to first message 361.

At block 801, the UE determines a set of indices for one or more PUCCH resources. Each index of the set of indices may correspond to a different beam of multiple beams. The multiple beams may include a first beam and a second beam. To illustrate, the UE may determine the set of indices using setting identifier logic 2004. The set of indices may include or correspond to repetition setting(s) 340.

At block 802, the UE transmits, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions. To illustrate, the UE may transmit the first PUCCH repetition and the second PUCCH repetition via wireless radios 2001a-r and antennas 252a-r. The first repetition and the second repetition may include or correspond to first repetition 362 and second repetition 363, respectively. In some implementations, the PUCCH resource may be selected by resource selector logic 2005. Additionally, or alternatively, the first beam and the second beam may be generated using beam generator logic 2006. In some implementations, the first beam corresponds to a first index of the set of indices, the second beam corresponds to a second index of the set of indices, or both. In some implementations, the multiple slot positions include multiple slots or multiple sub-slots of a slot.

In some implementation, the PUCCH resource configuration indicates a set of resource blocks (RBs), a set of symbols, a PUCCH format, or a combination thereof. In some such implementations, the PUCCH format indicates to perform PUCCH repetition based on a value of a number of slots field, such as a "nrofSlots" field of the RRC configuration. Additionally, or alternatively, a block may include the UE determining, based on the RRC configuration, whether to perform PUCCH repetition using the same beam for the multiple slot positions or using the multiple beams for the multiple slot positions.

In some implementations, a block may include the UE receiving a Medium Access Control (MAC)-Control Element (CE) for the PUCCH resource, and determining, based on the MAC-CE, an activated beam for the PUCCH resource. To illustrate, the activated beam may be determined using setting identifier logic 2004.

In some implementations, transmitting PUCCH repetitions includes: using the activated beam for a first slot position (e.g., an initial slot position) of the multiple slot positions; and using the multiple beams for slot positions of the multiple slot positions occurring subsequent to the first slot position. In some such implementations, the activated beam is included as one of the multiple beams used for the slot positions of the multiple slot positions occurring subsequent to the first slot position. Alternatively, the activated beam is omitted as one of the multiple beams used for the slot positions of the multiple slot positions occurring subsequent to the first slot position. To illustrate, the activated beam may be included in or omitted from the multiple beams based on repetition setting(s) 2002.

In some implementations, a number of the multiple beams is equal to a number of slot positions of the multiple slot positions—e.g., there is a one-to-one correspondence between the multiple beams and the number of slot positions. If a number of the multiple beams is less than a number of slot positions of the multiple slot positions, transmitting PUCCH repetitions includes: cycling through the multiple beams for a first set of slot positions of the multiple slot positions, the first set of slot positions including a number of slot positions equal to the number of the multiple beams; and using one or more beams of the multiple beams for a second set of slot positions of the multiple slot positions.

Referring to FIG. 9, at block 900, the UE receives a first RRC configuration including a PUCCH resource. To illustrate, the UE may receive the first RRC via wireless radios 2001*a-r* and antennas 252*a-r*. The first RRC configuration may include or correspond to first message 361.

At block 901, the UE receives a second RRC configuration including a PUCCH format. To illustrate, the UE may receive the second RRC via wireless radios 2001*a-r* and antennas 252*a-r*. The first RRC configuration may include or correspond to first message 361. In some implementations, the first and second RRC are included in the same message. In other implementations, the first RRC and the second RRC are included in different messages.

In some implementations, the first RRC configuration may include or correspond to a PUCCH-Config (e.g., "spatialRelationInfoToAddModList") for all PUCCH resources. Additionally, or alternatively, the second RRC configuration may include or correspond to a PUCCH-FormatConfig, and optionally, also with a number of slots (e.g., "nrofSlots") field. Accordingly, an RRC parameter for multiple beams (e.g., for purposes of repetition) may be defined based on the first RRC, the second RRC, or both the first and second RRCs. In some implementations, the second RRC includes multiple PUCCH formats and, for each PUCCH format included in the second RRC configuration, the second RRC configuration indicates a corresponding set of one or more beams.

At block 902, the UE determines, based on the PUCCH resource and the PUCCH format, multiple beams. The multiple beams may include a first beam and a second beam. In some implementations, a number of the multiple beams is equal to a number of slot positions of the multiple slot positions—e.g., there is a one-to-one correspondence between the multiple beams and the number of slot positions.

At block 903, the UE transmits, for the PUCCH resource: a first PUCCH repetition of multiple PUCCH repetitions using the first beam for a first slot position of multiple slot positions; and a second PUCCH repetition of the multiple PUCCH repetitions using the second beam for a second slot position of the multiple slot positions. The first slot position and the second slot position may be different slot positions. To illustrate, the UE may transmit the first PUCCH repetition and the second PUCCH repetition via wireless radios 2001*a-r* and antennas 252*a-r*. The first repetition and the second repetition may include or correspond to first repetition 362 and second repetition 363, respectively. In some implementations, the PUCCH resource may be selected by resource selector logic 2005. Additionally, or alternatively, the first beam and the second beam may be generated using beam generator logic 2006. In some implementations, the first beam corresponds to a first index of the set of indices, the second beam corresponds to a second index of the set of indices, or both. In some implementations, the multiple slot positions include multiple slots or multiple sub-slots of a slot.

In some implementations, a block may include, after transmitting the PUCCH resource, the UE receiving a third RRC configuration including a second PUCCH resource and a fourth RRC configuration including a second PUCCH format; and determining whether a set of one or more beams of the second PUCCH resource includes a single beam. If the set of one or more beams includes a single beam, the UE may perform PUCCH repetition using the single beam, such as PUCCH repetition across multiple slot positions where each PUCCH repetition is transmitted using the same beam (e.g., the same beam pattern). In some implementations, when a number of the multiple beams is less than a number of slot positions of the multiple slot positions, performing PUCCH repetition includes: cycling through the multiple beams for a first set of slot positions of the multiple slot positions, the first set of slot positions including a number of slot positions equal to the number of the multiple beams; and using one or more beams of the multiple beams for a second set of slot positions of the multiple slot positions.

Referring to FIG. 10, at block 1000, the UE receives Downlink Control Information (DCI) including a PRI field codepoint. To illustrate, the UE may receive the DCI via wireless radios 2001*a-r* and antennas 252*a-r*. The DCI may include or correspond to first message 361.

At block 1001, the UE determines, based on the PRI field codepoint, whether to transmit a PUCCH repetition within a slot position using a single PUCCH resource or transmit multiple PUCCH repetitions within the slot position using multiple PUCCH resources responsive to determining to transmit the multiple PUCCH repetitions within the slot position using the multiple PUCCH resources. For example, the UE may determine, based on the PRI field codepoint, to transmit PUCCH repetition within a slot position using a single PUCCH resource, such that repetition does not occur within the slot position, but may occur across multiple slot positions. As another example, the UE may determine, based on the PRI field codepoint, to transmit PUCCH repetition within a slot position using multiple PUCCH repetitions within the slot position using the multiple PUCCH resources, such that repetition occurs within the slot position, as described further herein. The slot position may include a slot or a sub-slot of the slot. In some implementations, the slot position is a sub-slot of a slot.

At block 1002, the UE transmits multiple PUCCH repetitions within the slot position using the multiple PUCCH resources. In some implementations, transmitting the multiple PUCCH repetitions includes: transmitting, using a first PUCCH resource of the multiple PUCCH resources, a first PUCCH repetition of the multiple PUCCH repetitions within the slot position; and transmitting, by the UE using a second PUCCH resource of the multiple PUCCH resources, a second PUCCH repetition of the multiple PUCCH repetitions within the slot position. To illustrate, the UE may transmit a first PUCCH repetition and a second PUCCH repetition via wireless radios 2001*a-r* and antennas 252*a-r*. The first PUCCH repetition and the second PUCCH repetition may include or correspond to first repetition 362 and second repetition 363, respectively. In some implementations, the PUCCH resource may be selected by resource selector logic 2005. Additionally, or alternatively, the first beam and the second beam may be generated using beam generator logic 2006.

In some implementations, the UE identifies the PRI field codepoint based on the DCI. To illustrate, the UE may identify the PRI field codepoint using setting identifier logic 2004.

In some implementations, a block may be included in which the UE maps the PRI field codepoint to a set of one or more interpreted PRI values. In some such implementations, prior to mapping, a block may include the UE receiving an RRC configuration, and configuring, based on the RRC configuration, the UE for mapping the PRI field codepoint to the set of one or more interpreted PRI values. Alternatively, prior to mapping, the UE may receive a MAC-CE, and may activate, based on the MAC-CE, a mapping functionality at the UE for mapping the PRI field codepoint to the set of one or more interpreted PRI values.

In some implementations, the set of one or more interpreted PRI values includes a single interpreted PRI value. In some implementations, the PRI field codepoint may be mapped to a single interpreted value. For example, the interpreted PRI value may be mapped to the same value or a different value as a value of the PRI field codepoint. Alternatively, the set of one or more interpreted PRI values may include multiple interpreted PRI values. In some such implementations, at least one of the multiple interpreted PRI values has the same value as a value of the PRI field codepoint. When the PRI field codepoint maps to multiple interpreted PRI values, the multiple interpreted PRI values may include a first interpreted PRI value corresponding to a first PUCCH resource and a second interpreted PRI value corresponding to a second PUCCH resource. The first PUCCH resource may correspond to a first activated beam, and the second PUCCH resource may correspond to a second activated beam different from the first activated beam.

In some implementations, the DCI may include a Downlink (DL) DCI scheduling a Physical Downlink Shared Channel (PDSCH), and the PUCCH repetition includes a Hybrid Automatic Repeat Request (HARQ)-ACK codebook. Additionally, or alternatively, a block may be included in which the UE receives multiple DCIs, such as multiple DCIs that include the DCI. Each of the multiple DCIs may include including a corresponding PRI codepoint and a corresponding Hybrid Automatic Repeat Request (HARQ) feedback timing indicator field. In some implementations, the corresponding vales of the HARQ feedback timing indicator field of the multiple DCIs indicate the same slot position for PUCCH transmission of HARQ-ACK feedback. The UE may identify a last detected DCI of the set of DCIs and may determine to perform PUCCH repetition if the corresponding PRI field codepoint of the last detected DCI indicates or corresponds to multiple PRI values. In some implementations, the UE may determine to perform PUCCH repetition based on at least one DCI of the set of DCI has a corresponding PRI field codepoint that indicates or corresponds to multiple PRI values. To illustrate, the UE may identify a last detected DCI of the set of DCIs and, when the detected DCI corresponds to a single PRI value and when the at least one DCI of the set of DCI has a corresponding PRI field codepoint that indicates multiple PRI values, may use a first PUCCH resource corresponding to the single PRI value and may use a second PUCCH resource corresponding to a most recently received DCI of the at least one received DCI that includes the value of the PRI field codepoint corresponding to the multiple PRI values.

Referring to FIG. 11, at block 1100, the UE receives DCI including a PRI field codepoint. To illustrate, the UE may receive the DCI via wireless radios 2001*a-r* and antennas 252*a-r*. The DCI may include or correspond to first message 361.

At block 1101, the UE maps the PRI field codepoint to a set of one or more interpreted PRI values. For example, the UE may map the PRI field code to the set of one or more interpreted PRI values using mapping information 2003.

At block 1102, the UE transmits multiple PUCCH repetitions within a slot position using multiple PUCCH resources based on the set of one or more interpreted PRI values. In some implementations, transmitting the multiple PUCCH repetitions includes: transmitting, using a first PUCCH resource of the multiple PUCCH resources, a first PUCCH repetition of the multiple PUCCH repetitions within the slot position; and transmitting, using a second PUCCH resource of the multiple PUCCH resources, a second PUCCH repetition of the multiple PUCCH repetitions within the slot position. To illustrate, the UE may transmit a first PUCCH repetition and a second PUCCH repetition via wireless radios 2001*a-r* and antennas 252*a-r*. The first PUCCH repetition and the second PUCCH repetition may include or correspond to first repetition 362 and second repetition 363, respectively. In some implementations, the PUCCH resource may be selected by resource selector logic 2005. Additionally, or alternatively, the first beam and the second beam may be generated using beam generator logic 2006. The slot position may include a slot or a sub-slot of the slot. In some implementations, the slot position is a sub-slot of a slot.

In some implementations, the UE identifies the PRI field codepoint based on the DCI. To illustrate, the UE may identify the PRI field codepoint using setting identifier logic 2004.

In some implementations, a block may include the UE determining whether the DCI points to multiple TCI states. The UE may determine to not perform mapping based on a determination that the DCI points to a single TCI state. Alternatively, the UE may determine to perform mapping based on a determination that the DCI points to the multiple TCI states. Based on a determination to perform the PUCCH repetition using the multiple PUCCH resources, the UE may select a first PUCCH resource as a first of the multiple PUCCH resources, the first PUCCH resource corresponding to the value of the PRI filed codepoint, and select a second PUCCH resource as a second of the multiple PUCCH resources. To illustrate, the UE may select the first and second PUCCH resources using the resource selector logic 2005. The second PUCCH resource is selected from a set of available PUCCH resources within a PUCCH resource set, excluding the selected PUCCH resource. For example, the second resource may be selected based on satisfying one or more rules/conditions, such as not overlapping with the first PUCCH resource, starting after the first PUCCH resource, having a different activated beam from an activated beam of the first PUCCH resource, having an activated beam corresponding to the same QCL source as at least one TCI state pointed to by the DCI, or a combination thereof.

Referring to FIG. 12, at block 1200, the UE receives an RRC configuration. To illustrate, the UE may receive the RRC via wireless radios 2001*a-r* and antennas 252*a-r*. The RRC configuration may include or correspond to first message 361.

At block 1201, the UE determines, based on the RRC configuration, whether to transmit multiple PUCCH repetitions. To illustrate, the UE may make such a determination using setting identifier logic 2004.

At block 1202, in response to a determination to transmit the multiple PUCCH repetitions, the UE determines whether to transmit a single PUCCH repetition within a slot position using a single PUCCH resource or multiple PUCCH repetitions within the slot position using multiple PUCCH resources. To illustrate, the UE may make such a determination using setting identifier logic 2004. The slot position may include a slot or a sub-slot of the slot. In some implementations, the slot position is a sub-slot of a slot.

At block 1203, the UE transmitting, by the UE, the two or more PUCCH repetitions within the slot position using the multiple PUCCH resources. In some implementations, transmitting the two or more PUCCH repetitions includes: transmitting, using a first PUCCH resource of the multiple PUCCH resources, a first PUCCH repetition of the two or more PUCCH repetitions within the slot position; and transmitting, by the UE using a second PUCCH resource of the multiple PUCCH resources, a second PUCCH repetition of the two or more PUCCH repetitions within the slot position. To illustrate, the UE may transmit a first PUCCH repetition and a second PUCCH repetition via wireless radios 2001*a-r* and antennas 252*a-r*. The first PUCCH repetition and the second PUCCH repetition may include or correspond to first repetition 362 and second repetition 363, respectively. In some implementations, the PUCCH resource may be selected by resource selector logic 20054. Additionally, or alternatively, the first beam and the second beam may be generated using beam generator logic 2006.

It is noted that one or more blocks (or operations) described with reference to FIGS. 8-12 may be combined with one or more blocks (or operations) of another of figure. For example, one or more blocks of FIGS. 8-12 may be combined with one or more blocks (or operations) of another of FIG. 2, 3, or 20. Additionally, or alternatively, one or more operations described above with reference to FIGS. 1-5 may be combine with one or more operations described with reference to FIG. 8-12

FIGS. 13-19 are block diagrams illustrating example blocks executed by a base station configured according to an aspect of the present disclosure. The example blocks will also be described with respect to base station 105 as illustrated in FIG. 21, which may include or correspond to base station 105 of FIG. 3, first entity 405 or second entity 410 of FIGS. 4 and 5. FIG. 21 is a block diagram illustrating base station 105 configured according to one aspect of the present disclosure. Base station 105 includes the structure, hardware, and components as illustrated for base station 105 of FIG. 2 or 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 2101*a-t* and antennas 234*a-t*. Wireless radios 2101*a-t* includes various components and hardware, as illustrated in FIG. 2 for base station 105, including modulator/demodulators 232*a-t*, transmit processor 220, TX MIMO processor 230, MIMO detector 236, and receive processor 238. As shown, memory 242 may include UE information 2102, beam information 2103, configuration setting(s) 2104, mapping information 2105, TCI state information 2106, and RRC configuration information 2017. UE information 2012, beam information 2103, configuration setting(s) 2104, mapping information 2105, and TCI state information 2106 may include or correspond to UE information 320, beam information 322, configuration setting(s) 324, mapping information 326, and TCI state information 328. RRC configuration logic 2107 may include or correspond to RRC configuration generator 314. In some aspects, RRC configuration logic 2107 may include or correspond to processor(s) 302. Base station 105 may receive signals from or transmit signal to a UE, such as UE 115 as illustrated in FIG. 20.

Referring to FIG. 13, at block 1300, the base station determines a set of indices for one or more PUCCH resources. Each index of the set of indices corresponding to a different beam of multiple beams. To illustrate, the set of indices may include or correspond to UE information 2102, beam information 2103, configuration setting(s) 2104, or a combination thereof.

At block 1301, the base station transmits an RRC configuration including the set of indices and a PUCCH resource. To illustrate, the base station may transmit the RRC via wireless radios 2101*a-t* and antennas 234*a-t*. The RRC configuration may include or correspond to first message 361. Additionally, the RRC configuration may be generated by RRC configuration logic 2107.

At block 1302, the base station receives, for the PUCCH resource and based on the RRC configuration, multiple PUCCH repetitions for multiple slot positions. To illustrate, the base station may receive the multiple PUCCH repetitions via wireless radios 2101*a-t* and antennas 234*a-t*. Receiving the multiple PUCCH repetitions may include receiving a first PUCCH repetition of the multiple PUCCH repetitions via a first beam of the multiple beams for a first slot position of the multiple slot positions, and receiving a second PUCCH repetition of the multiple PUCCH repetitions via a second beam of the multiple beams for a second slot position of the multiple slot positions. Additionally, or alternatively, the first beam corresponds to a first index of the set of indices; and the second beam corresponds to a second index of the set of indices. The first PUCCH repetition and the second PUCCH repetition may include or correspond to first repetition 362 and second repetition 363, respectively. The multiple slot positions my include multiple slots or multiple sub-slots of a slot.

In some implementations, the PUCCH resource configuration indicates a set of resource blocks (RBs), a set of symbols, a PUCCH format, or a combination thereof. Additionally, or alternatively, the PUCCH format indicates to perform PUCCH repetition based on a value of a number of slots field.

In some implementations, the base stations may determine an activated beam for the PUCCH resource. In some such implementations, the base station, may transmit a MAC-CE for the PUCCH resource that indicates the activated beam.

Referring to FIG. 14, at block 1400, the base station generates a first RRC configuration including a PUCCH resource. To illustrate, the base station may generate the first RRC configuration using RRC configuration logic 2107. At block 1401, the base station generates a second RRC configuration including a PUCCH format corresponding to multiple beams. To illustrate, the base station may generate the second RRC configuration using RRC configuration logic 2107. The PUCCH format may correspond to the PUCCH resource and indicate a number of slot positions and indicate the multiple beams.

At block 1402, the base station transmits the first RRC configuration and the second RRC configuration. To illustrate, the base station may transmit the RRC(s) via wireless radios 2101*a-t* and antennas 234*a-t*. The first and second RRC configuration may be included in or correspond to first message 361.

At block 1403, the base station receives, for the PUCCH resource, multiple PUCCH repetitions for multiple slot positions. To illustrate, the base station may receive the multiple PUCCH repetitions via wireless radios 2101*a-t* and antennas 234*a-t*. Receiving the multiple PUCCH repetitions may include receiving a first PUCCH repetition of the multiple PUCCH repetitions using a first beam of the multiple beams for a first slot position of the multiple slot positions, and receiving a second PUCCH repetition of the multiple PUCCH repetitions using a second beam the multiple beams for a second slot position of the multiple slot positions. Additionally, or alternatively, the first beam corresponds to a first index of the set of indices; and the second beam corresponds to a second index of the set of indices. The first PUCCH repetition and the second PUCCH repetition may include or correspond to first repetition 362 and second repetition 363, respectively. The multiple slot positions my include multiple slots or multiple sub-slots of a slot. In some implementations, a number of the multiple beams is equal to a number of slot positions of the multiple slot positions.

Referring to FIG. 15, at block 1500, the base station identifies a PRI field codepoint that indicates to transmit a PUCCH repetition within a slot position using a single PUCCH resource or transmit multiple PUCCH repetitions within a slot position using multiple PUCCH resources. For example, the PRI field codepoint may indicate to perform PUCCH repetition within the slot position using the multiple PUCCH resources.

At block 1501, the base station transmits Downlink Control Information (DCI) including the PRI field codepoint. To illustrate, the base station may transmit the DCI via wireless radios 2101*a-t* and antennas 234*a-t*. The DCI may be included in or correspond to first message 361.

At block 1502, the base station receives PUCCH repetition within the slot position using the multiple PUCCH resources. To illustrate, the base station may receive the multiple PUCCH repetitions via wireless radios 2101*a-t* and antennas 234*a-t*. Receiving the multiple PUCCH repetitions may include receiving, using a first PUCCH resource of the multiple PUCCH resources, a first PUCCH repetition of the multiple PUCCH repetitions within the slot position, and receiving, using a second PUCCH resource of the multiple PUCCH resources, a second PUCCH repetition of the multiple PUCCH repetitions within the slot position. Additionally, or alternatively, the first beam corresponds to a first index of the set of indices; and the second beam corresponds to a second index of the set of indices. The first PUCCH repetition and the second PUCCH repetition may include or correspond to first repetition 362 and second repetition 363, respectively. In some implementations, the slot position includes a slot or a sub-slot of the slot.

Referring to FIG. 16, at block 1600, the base station identifies a PRI field codepoint that indicates to perform a mapping of the PRI field codepoint to a set of one or more interpreted PRI values. Mapping may be based on or correspond to mapping information 2105. The PRI field codepoint may include or correspond to configuration setting(s) 2104.

At block 1601, the base station transmits DCI including the PRI field codepoint. To illustrate, the base station may transmit the DCI via wireless radios 2101*a-t* and antennas 234*a-t*. The DCI may be included in or correspond to first message 361.

At block 1602, the base station receives multiple PUCCH repetitions within a slot position using multiple PUCCH resources corresponding to the one or more interpreted PRI values. To illustrate, the base station may receive the multiple PUCCH repetitions via wireless radios 2101*a-t* and antennas 234*a-t*. Receiving the multiple PUCCH repetitions may include receiving, by the base station using a first PUCCH resource of the multiple PUCCH resources, a first PUCCH repetition of the multiple PUCCH repetitions within the slot position, and receiving, by the base station using a second PUCCH resource of the multiple PUCCH resources, a second PUCCH repetition of the multiple PUCCH repetitions within the slot position. The first PUCCH repetition and the second PUCCH repetition may include or correspond to first repetition 362 and second repetition 363, respectively. The multiple slot positions may include multiple slots or multiple sub-slots of a slot.

Referring to FIG. 17, at block 1700, the base station identifies a PRI field codepoint that indicates to perform a mapping of the PRI field codepoint to a set of one or more interpreted PRI values. Mapping may be based on or correspond to mapping information 2105. The PRI field codepoint may include or correspond to configuration setting(s) 2104.

At block 1701, the base station transmits DCI including the PRI field codepoint. To illustrate, the base station may transmit the DCI via wireless radios 2101*a-t* and antennas 234*a-t*. The DCI may be included in or correspond to first message 361.

At block 1702, the base station receives PUCCH repetition within a slot position using multiple PUCCH resources corresponding to the one or more interpreted PRI values. To illustrate, the base station may receive the multiple PUCCH repetitions via wireless radios 2101*a-t* and antennas 234*a-t*. Receiving the PUCCH repetition may include receiving, using a first PUCCH resource of the multiple PUCCH resources, a first PUCCH repetition within the slot position, and receiving, using a second PUCCH resource of the multiple PUCCH resources, a second PUCCH repetition within the slot position. The first PUCCH repetition and the second PUCCH repetition may include or correspond to first repetition 362 and second repetition 363, respectively. The slot position may include a slot or a sub-slot of the slot.

Figure 18:
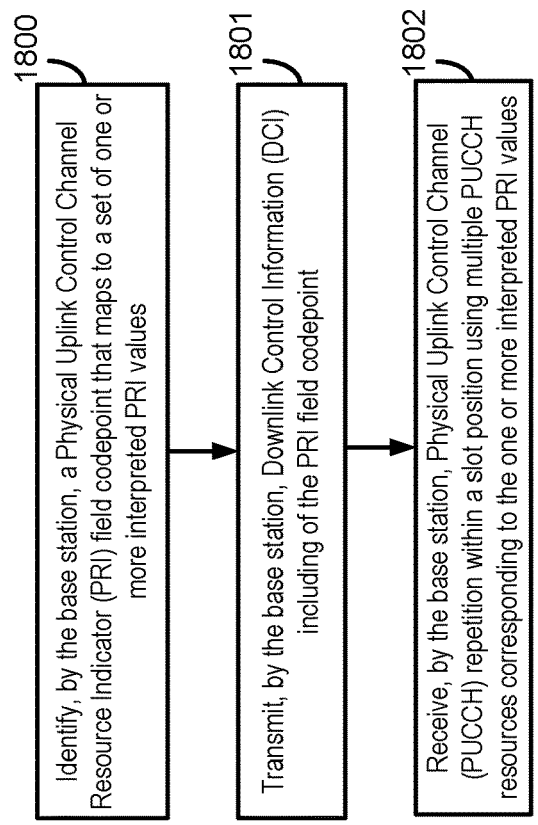
FIG. 18 is a block diagram illustrating example blocks executed by a base station configured according to an aspect of the present disclosure.

Referring to FIG. 18, at block 1800, the base station identifies a PRI field codepoint that maps to a set of one or more interpreted PRI values. The set of one or more interpreted PRI values may include at least two interpreted PRI values. Mapping may be based on or correspond to mapping information 2105. The PRI field codepoint may include or correspond to configuration setting(s) 2104.

At block 1801, the base station transmits DCI including the PRI field codepoint. To illustrate, the base station may transmit the DCI via wireless radios 2101*a-t* and antennas 234*a-t*. The DCI may be included in or correspond to first message 361.

At block 1803, the base station receiving, by the base station, PUCCH repetition within a slot position using multiple PUCCH resources corresponding to the one or more interpreted values. To illustrate, the base station may receive multiple PUCCH repetitions via wireless radios 2101*a-t* and antennas 234*a-t*. Receiving the PUCCH repetition may include receiving, using a first PUCCH resource of the multiple PUCCH resources, a first PUCCH repetition within the slot position, and receiving, using a second PUCCH resource of the multiple PUCCH resources, a second PUCCH repetition within the slot position. The first PUCCH repetition and the second PUCCH repetition may include or correspond to first repetition 362 and second repetition 363, respectively. The slot position may include a slot or a sub-slot of the slot.

Figure 19:
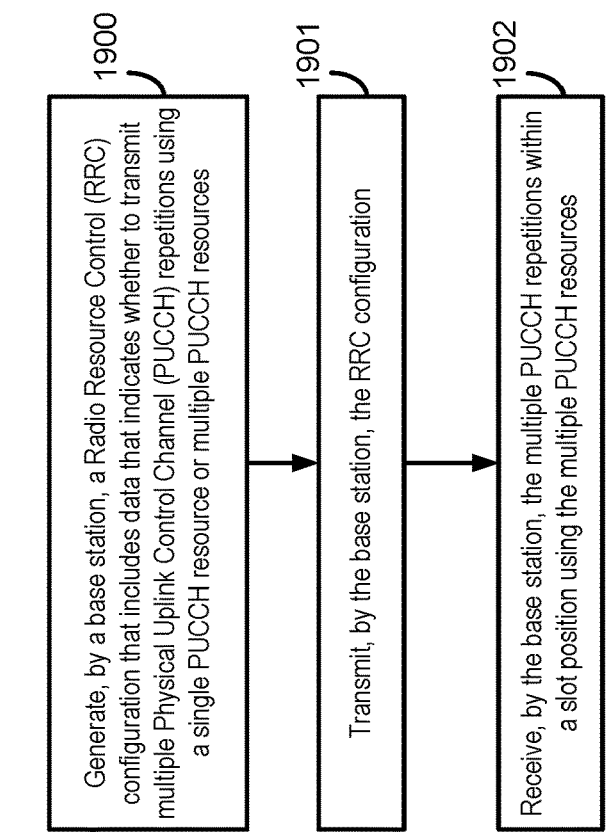
FIG. 19 is a block diagram illustrating example blocks executed by a base station configured according to an aspect of the present disclosure.

Referring to FIG. 19, at block 1900, the base station generates an RRC configuration that includes data that indicates whether to transmit multiple PUCCH repetitions using a single PUCCH resource or multiple PUCCH resources. The RRC configuration may be generated by RRC configuration logic 2107.

At block 1901, the base station transmits the RRC configuration. To illustrate, the base station may transmit the RRC via wireless radios 2101a-t and antennas 234a-t. The RRC configuration may include or correspond to first message 361.

At block 1902, the base station receives the multiple PUCCH repetitions within a slot position using multiple PUCCH resources. To illustrate, the base station may receive the multiple PUCCH repetitions via wireless radios 2101a-t and antennas 234a-t. Receiving the multiple PUCCH repetitions may include receiving, by the base station using a first PUCCH resource of the multiple PUCCH resources, a first PUCCH repetition of the multiple PUCCH repetitions within the slot position, and receiving, by the base station using a second PUCCH resource of the multiple PUCCH resources, a second PUCCH repetition of the multiple PUCCH repetitions within the slot position. The first PUCCH repetition and the second PUCCH repetition may include or correspond to first repetition 362 and second repetition 363, respectively. The slot position may include a slot or a sub-slot of the slot.

In some implementations, the UE may determine whether to receive the multiple PUCCH repetitions. Additionally, or alternatively, the UE may determine whether to receive a PUCCH repetition within the slot position using a single PUCCH resource or the multiple PUCCH resources; or a combination thereof.

It is noted that one or more blocks (or operations) described with reference to FIG. 13-19 may be combined with one or more blocks (or operations) of another of figure. For example, one or more blocks of FIGS. 13-19 may be combined with one or more blocks (or operations) of another of FIG. 2, 3, or 21. Additionally, or alternatively, one or more operations described above with reference to FIGS. 1-5 may be combine with one or more operations described with reference to FIGS. 13-19.

In some aspects, techniques for enabling PUCCH repetition may include additional aspects, such as any single aspect or any combination of aspects described below or in connection with one or more other processes or devices described elsewhere herein. In some aspects, enabling PUCCH repetition may include an apparatus configured to receive a RRC configuration including a PUCCH resource, determine a set of indices for one or more PUCCH resources, each index of the set of indices corresponding to a different beam of multiple beams, the multiple beams including a first beam and a second beam. The apparatus also may be configured to transmit, for the PUCCH resource: a first PUCCH repetition of multiple PUCCH repetitions using the first beam for a first slot position of multiple slot positions, and a second PUCCH repetition of the multiple PUCCH repetitions using the second beam for a second slot position of the multiple slot positions. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a first aspect, the PUCCH resource configuration indicates a set of resource blocks (RBs), a set of symbols, a PUCCH format, or a combination thereof.

In a second aspect, alone or in combination with the first aspect, the PUCCH format indicates to perform PUCCH repetition based on a value of a number of slots field.

In a third aspect, the first beam corresponds to a first index of the set of indices.

In a fourth aspect, alone or in combination with the third aspect, the second beam corresponds to a second index of the set of indices.

In a fifth aspect, the apparatus is further configured to determine, based on the RRC configuration, whether to perform PUCCH repetition using the same beam for the multiple slot positions or using the multiple beams for the multiple slot positions.

In a sixth aspect, the apparatus is further configured to receive a MAC-CE for the PUCCH resource.

In a seventh aspect, in combination with the sixth aspect, the apparatus is further configured to determine, based on the MAC-CE, an activated beam for the PUCCH resource.

In an eighth aspect, in combination with the seventh aspect, to transmit the PUCCH repetition, the apparatus is configured to use the activated beam for a first slot position of the multiple slot positions, the first slot position corresponding to an initial slot position of the multiple slot positions.

In a ninth aspect, in combination with the eighth aspect, to transmit the PUCCH repetition, the apparatus is configured to use the multiple beams for slot positions of the multiple slot positions occurring subsequent to the first slot position.

In a tenth aspect, in combination with one or more of the eighth through ninth aspects, the activated beam is included as one of the multiple beams used for the slot positions of the multiple slot positions occurring subsequent to the first slot position.

In an eleventh aspect, in combination with one or more of the eighth through ninth aspects, the activated beam is omitted as one of the multiple beams used for the slot positions of the multiple slot positions occurring subsequent to the first slot position.

In a twelfth aspect, when a number of the multiple beams is less than a number of slot positions of the multiple slot positions, to transmit the PUCCH repetitions, the apparatus is further configured to cycle through the multiple beams for a first set of slot positions of the multiple slot positions.

In a thirteenth aspect, in combination with the twelfth aspect, the first set of slot positions including a number of slot positions equal to the number of the multiple beams.

In a fourteenth aspect, in combination with one or more of the twelfth through thirteenth aspects, when a number of the multiple beams is less than a number of slot positions of the multiple slot positions, to transmit the PUCCH repetitions, the apparatus uses one or more beams of the multiple beams for a second set of slot positions of the multiple slot positions.

In a fifteenth aspect, a number of the multiple beams is equal to a number of slot positions of the multiple slot positions.

In a sixteenth aspect, alone or in combination with one or more of the first through fifteenth aspect, the multiple slot positions include multiple slots or multiple sub-slots of a slot.

In some aspects, an apparatus configured for wireless communication, such as a UE, is configured to receive a first RRC configuration including a PUCCH resource, and determine, based on the PUCCH resource and the PUCCH format, multiple beams, the multiple beams including a first beam and a second beam. The apparatus is also configured to transmit, for the PUCCH resource: a first PUCCH repetition of multiple PUCCH repetitions using the first beam for a first slot position of multiple slot positions, and a second PUCCH repetition of the multiple PUCCH repetitions using the second beam for a second slot position of the multiple slot positions. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a seventeenth aspect, the second RRC includes multiple PUCCH formats.

In an eighteenth aspect, in combination with the seventeenth aspect, for each PUCCH format included in the second RRC configuration, the second RRC configuration indicates a corresponding set of one or more beams.

In a nineteenth aspect, a number of the multiple beams is equal to a number of slot positions of the multiple slot positions.

In a twentieth aspect, after transmission of the PUCCH resource, the apparatus is further configured to receive a third RRC configuration including a second PUCCH resource and a fourth RRC configuration including a second format.

In a twenty-first aspect, in combination with the twentieth aspect, the apparatus is further configured to determine, based on the second PUCCH resource and the second PUCCH format, a set of one or more beams.

In a twenty-second aspect, in combination with the twenty-first aspect, the apparatus is further configured to determine whether the set of one or more beams includes a single beam; and In a twenty-third aspect, in combination with the twenty-first through twenty-second aspects, if the set of one or more beams includes a single beam, the apparatus is further configured to perform PUCCH repetition using the single beam.

In a twenty-fourth aspect, when a number of the multiple beams is less than a number of slot positions of the multiple slot positions, to perform PUCCH repetition, the apparatus is further configured to cycle through the multiple beams for a first set of slot positions of the multiple slot positions.

In a twenty-fifth aspect, in combination with the twenty-fourth aspect, the first set of slot positions includes a number of slot positions equal to the number of the multiple beams.

In a twenty-sixth aspect, in combination with one or more of the twenty-fourth through twenty-fifth aspects, when a number of the multiple beams is less than a number of slot positions of the multiple slot positions, to perform PUCCH repetition, the apparatus is further configured to use one or more beams of the multiple beams for a second set of slot positions of the multiple slot positions.

In a twenty-seventh aspect, alone or in combination with one or more of the seventeenth through twenty-sixth aspects, the multiple slot positions include multiple slots or multiple sub-slots of a slot.

In some aspects, an apparatus configured for wireless communication, such as a UE, is configured to receive DCI including a PRI field codepoint, and determine, based on the PRI field codepoint, whether to transmit a PUCCH repetition within a slot position using a single PUCCH resource or transmit multiple PUCCH repetitions within the slot position using multiple PUCCH resources. The apparatus is also configured to transmit multiple PUCCH repetitions within the slot position using the multiple PUCCH resources responsive to determining to transmit the multiple PUCCH repetitions within the slot position using the multiple PUCCH resources. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a twenty-eighth aspect, to transmit the multiple PUCCH repetitions, the apparatus is further configured to transmit, using a first PUCCH resource of the multiple PUCCH resources, a first PUCCH repetition of the multiple PUCCH repetitions within the slot position.

In a twenty-ninth aspect, in combination with the twenty-eighth aspect, to transmit the multiple PUCCH repetitions, the apparatus is further configured to transmit, using a second PUCCH resource of the multiple PUCCH resources, a second PUCCH repetition of the multiple PUCCH repetitions within the slot position.

In a thirtieth aspect, the apparatus is further configured to map the value of the PRI field codepoint to a set of one or more interpreted PRI values.

In a thirty-first aspect, in combination with the thirtieth aspect, the apparatus is further configured to receive a RRC configuration.

In a thirty-second aspect, in combination with the thirty-first aspect, the apparatus is further configured to, based on the RRC configuration, configured the apparatus for mapping the PRI field codepoint to the set of one or more interpreted PRI values.

In a thirty-third aspect, in combination with one or more of the thirtieth through thirty-second aspects, the apparatus is further configured to receive a MAC-CE.

In a thirty-fourth aspect, in combination with the thirty-fourth aspect, the apparatus is further configured to activate, based on the MAC-CE, a mapping functionality for mapping the PRI field codepoint to the set of one or more interpreted PRI values.

In a thirty-fifth aspect, in combination with one or more of the thirtieth through thirty-third aspects, the set of one or more interpreted PRI values includes multiple interpreted PRI values.

In a thirty-sixth aspect, in combination with the thirty-fifth aspect, at least one of the multiple interpreted PRI values has the same value as the value of the PRI field codepoint.

In a thirty-seventh aspect, in combination with one or more of the thirty-fifth through thirty-sixth aspects, the multiple interpreted PRI values include a first interpreted PRI value corresponding to a first PUCCH resource.

In a thirty-eighth aspect, in combination with one or more of the thirty-fifth through thirty-seventh aspects, the multiple interpreted PRI values include a second interpreted PRI value corresponding to a second PUCCH resource.

In a thirty-ninth aspect, in combination with one or more of the thirty-seventh through thirty-eighth aspects, the first PUCCH resource corresponds to a first activated beam; and In a fortieth aspect, in combination with one or more of the thirty-eighth through thirty-ninth aspects, the second PUCCH resource corresponds to a second activated beam different from the first activated beam.

In a forty-first aspect, the DCI includes a DL DCI scheduling a PDSCH, and the PUCCH repetition includes a HARQ-ACK codebook.

In a forty-second aspect, the apparatus is further configured to receive multiple DCIs, the multiple DCIs including the DCI, each of the multiple DCIs including a corresponding PRI field codepoint and a corresponding HARQ feedback timing indicator field.

In a forty-third aspect, in combination with the forty-second aspect, the corresponding values of the HARQ feedback timing indicator field of the multiple DCIs indicate the same slot position for PUCCH transmission of HARQ-ACK feedback.

In a forty-fourth aspect, in combination with the forty-third aspect, the apparatus is further configured to identify a last detected DCI of the set of DCIs.

In a forty-fifth aspect, in combination with the forty-fourth aspect, the apparatus is further configured to determine to perform PUCCH repetition if the corresponding PRI field codepoint of the last detected DCI indicates multiple PRI values.

In a forty-sixth aspect, in combination with one or more of the forty-third through forty-fifth aspects, the apparatus is further configured to determine to perform PUCCH repetition based on at least one DCI of the set of DCI has a corresponding PRI field codepoint that indicates multiple PRI values.

In a forty-seventh aspect, in combination with the forty-sixth aspect, the apparatus is further configured to identify a last detected DCI of the set of DCIs.

In a forty-eighth aspect, in combination with the forty-seventh aspect, when the detected DCI corresponds to a single PRI value and when the at least one DCI of the set of DCI has a corresponding PRI field codepoint that indicates multiple PRI values, the apparatus is further configured to use a first PUCCH resource corresponding to the single PRI value.

In a forty-ninth aspect, in combination with one or more of the forty-seventh through forty-eighth aspects, when the detected DCI corresponds to a single PRI value and when the at least one DCI of the set of DCI has a corresponding PRI field codepoint that indicates multiple PRI values, the apparatus is further configured to use a second PUCCH resource corresponding to a most recently received DCI of the at least one received DCI that includes the value of the PRI field codepoint corresponding to the multiple PRI values.

In a fiftieth aspect, alone or in combination with one or more of the twenty-eighth through forty-ninth aspects, the slot position includes a slot or a sub-slot of the slot.

In some aspects, an apparatus configured for wireless communication, such as a UE, is configured to receive DCI including a PRI field codepoint, and map the PRI field codepoint to a set of one or more interpreted PRI values. The apparatus is also configured to transmit multiple PUCCH repetitions within a slot position using multiple PUCCH resources based on the set of one or more interpreted PRI values. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a fifty-first aspect, to transmit the multiple PUCCH repetitions, the apparatus is further configured to transmit, using a first PUCCH resource of the multiple PUCCH resources, a first PUCCH repetition of the multiple PUCCH repetitions within the slot position In a fifty-second aspect, in combination with the fifty-first aspect, to transmit the multiple PUCCH repetitions, the apparatus is configured to transmit, using a second PUCCH resource of the multiple PUCCH resources, a second PUCCH repetition of the multiple PUCCH repetitions within the slot position.

In a fifty-third aspect, the apparatus is further configured to determine whether the DCI points to multiple TCI states and determine to perform the mapping based on a determination that the DCI points to the multiple TCI states.

In a fifty-fourth aspect, in combination with the thirtieth aspect, the multi the multiple PUCCH repetitions are transmitted within the slot position using the multiple PUCCH resources based on the set of one or more interpreted PRI values and the apparatus is configured to determine whether to perform the mapping.

In a fifty-fifth aspect, in combination with one or more of the fifty-third through fifty-fourth aspects, the apparatus is further configured to, based on a determination to perform the PUCCH repetition using the multiple PUCCH resources, select a first PUCCH resource as a first of the multiple PUCCH resources, the first PUCCH resource corresponding to the value of the PRI filed codepoint.

In a fifty-sixth aspect, in combination with the fifty-fifth aspect, the apparatus is further configured to, based on a determination to perform the PUCCH repetition using the multiple PUCCH resources, select a second PUCCH resource as a second of the multiple PUCCH resources.

In a fifty-seventh aspect, in combination with the fifty-fifth through fifty-sixth aspects, the second PUCCH resource is selected from a set of available PUCCH resources within a PUCCH resource set, excluding the selected PUCCH resource, based on: not overlapping with the first PUCCH resource; starting after the first PUCCH resource; having a different activated beam from an activated beam of the first PUCCH resource; having an activated beam corresponding to the same QCL source as at least one TCI state pointed to by the DCI; or a combination thereof.

In a fifty-eighth aspect, alone or in combination with one or more of the fifty-first through fifty-seventh aspects, the slot position includes a slot or a sub-slot of the slot.

In some aspects, an apparatus configured for wireless communication, such as a UE, is configured to receive a RRC configuration, and determine, based on the RRC configuration, whether to transmit multiple PUCCH repetitions. The apparatus is further configured to, in response to a determination to transmit the multiple PUCCH repetitions, determine, based on the RRC configuration, whether to transmit a single PUCCH repetition of the multiple PUCCH repetitions within a slot position using a single PUCCH resource or two or more PUCCH repetitions of the multiple PUCCH repetitions within the slot position using multiple PUCCH resources. The apparatus is also configured to transmit the two or more PUCCH repetitions within the slot position using the multiple PUCCH resources. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a fifty-ninth aspect, to transmit the two or more PUCCH repetitions, the apparatus is further configured to transmit, using a first PUCCH resource of the multiple PUCCH resources, a first PUCCH repetition of the two or more PUCCH repetitions within the slot position.

In a sixtieth aspect, in combination with the fifty-ninth aspect, to transmit the two or more PUCCH repetitions, the apparatus is further configured to transmit, using a second PUCCH resource of the multiple PUCCH resources, a second PUCCH repetition of the two or more PUCCH repetitions within the slot position.

In a sixty-first aspect, alone or in combination with one or more of the fifty-ninth through sixtieth aspects, the slot position includes a slot or a sub-slot of the slot.

In some aspects, an apparatus configured for wireless communication, such as a base station, is configured to determine a set of indices for one or more PUCCH resources, each index of the set of indices corresponding to a different beam of multiple beams, and transmit a RRC configuration including the set of indices and a PUCCH resource. The apparatus is also configured to receive for the PUCCH resource, multiple PUCCH repetitions for multiple slot positions, where the multiple PUCCH repetitions include a first PUCCH repetition of the multiple PUCCH repetitions received via a first beam of the multiple beams for a first slot position of the multiple slot positions, and a second PUCCH repetition of the multiple PUCCH repetitions received via a second beam of the multiple beams for a second slot position of the multiple slot positions. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a sixty-second aspect, the PUCCH resource configuration indicates a set of RBs, a set of symbols, a PUCCH format, or a combination thereof.

In a sixty-third aspect, in combination with the sixty-second aspect, the PUCCH format indicates to perform PUCCH repetition based on a value of a number of slots field.

In a sixty-fourth aspect, the first beam corresponds to a first index of the set of indices.

In a sixty-fifth aspect, alone or in combination with the sixty-fourth aspect, the second beam corresponds to a second index of the set of indices.

In a sixty-sixth aspect, the apparatus is further configured to determine an activated beam for the PUCCH resource.

In a sixty-seventh aspect, in combination with the sixty-sixth aspect, the apparatus is further configured to transmit a MAC-CE for the PUCCH resource that indicates the activated beam.

In a sixty-eighth aspect, alone or in combination with one or more of the sixty-second through sixty-seventh aspects, the multiple slot positions include multiple slots or multiple sub-slots of a slot.

In some aspects, an apparatus configured for wireless communication, such as a base station, is configured to generate a first RRC configuration including a PUCCH resource, generate a second RRC configuration including a PUCCH format corresponding to multiple beams, and transmit the first RRC configuration and the second RRC configuration. The apparatus is also configured to receive, for the PUCCH resource, multiple PUCCH repetitions for multiple slot positions, where the multiple PUCCH repetitions include: a first PUCCH repetition of the multiple PUCCH repetitions received via a first beam of the multiple beams for a first slot position of the multiple slot positions, and a second PUCCH repetition of the multiple PUCCH repetitions received via a second beam of the multiple beams for a second slot position of the multiple slot positions. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a sixty-ninth aspect, the PUCCH format corresponds to the PUCCH resource and indicates a number of slot positions and indicates the multiple beams.

In a seventieth aspect, in combination with the sixty-ninth aspect, a number of the multiple beams is equal to a number of slot positions of the multiple slot positions.

In a seventy-first aspect, alone or in combination with one or more of the sixty-ninth through seventieth aspects, the multiple slot positions include multiple slots or multiple sub-slots of a slot.

In some aspects, an apparatus configured for wireless communication, such as a base station, is configured to identify a PRI field codepoint that indicates to perform PUCCH repetition within a slot position using a single PUCCH resource or multiple PUCCH resources, and transmit DCI including the PRI field codepoint. The apparatus is also configured to receive PUCCH repetition within the slot position using the multiple PUCCH resources. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a seventy-second aspect, to receive the PUCCH repetition, the apparatus is further configured to receive, using a first PUCCH resource of the multiple PUCCH resources, a first PUCCH repetition within the slot position.

In a seventy-third aspect, in combination with the seventy-second aspect, the apparatus is further configured to receive the PUCCH repetition, the apparatus is further configured to receive, using a second PUCCH resource of the multiple PUCCH resources, a second PUCCH repetition within the slot position.

In a seventy-fourth aspect, alone or in combination with one or more of the seventy-second through seventy-third aspects, the PRI field codepoint indicates to perform PUCCH repetition within the slot position using the multiple PUCCH resources.

In a seventy-fifth aspect, alone or in combination with one or more of the seventy-second through seventy-fourth aspects, the slot position includes a slot or a sub-slot of the slot.

In some aspects, an apparatus configured for wireless communication, such as a base station, is configured to identify a PRI field codepoint that indicates to transmit a PUCCH repetition within a slot position using a single PUCCH resource or transmit multiple PUCCH repetitions within a slot position using multiple PUCCH resources. The apparatus is also configured to transmit DCI including the PRI field codepoint, and receive multiple PUCCH repetitions within a slot position using multiple PUCCH resources. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a seventy-sixth aspect, to receive the multiple PUCCH repetitions, the apparatus is further configured to receive, using a first PUCCH resource of the multiple PUCCH resources, a first PUCCH repetition of the multiple PUCCH repetitions within the slot position.

In a seventy-seventh aspect, alone or in combination with the seventy-sixth aspect, to receive the multiple PUCCH repetitions, the apparatus is further configured to receive, using a second PUCCH resource of the multiple PUCCH resources, a second PUCCH repetition of the multiple PUCCH repetitions within the slot position.

In a seventy-eighth aspect, alone or in combination with one or more of the seventy-sixth through seventy-seventh aspects, the multiple slot positions include multiple slots or multiple sub-slots of a slot.

In some aspects, an apparatus configured for wireless communication, such as a base station, is configured to identify a PRI field codepoint that indicates to perform a mapping of the PRI field codepoint to a set of one or more interpreted PRI values, and transmit DCI including the PRI field codepoint. The apparatus is also configured to receive PUCCH repetition within a slot position using multiple PUCCH resources corresponding to the one or more interpreted PRI values. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a seventy-ninth aspect, to receive the PUCCH repetition, the apparatus is further configured to receive, using a first PUCCH resource of the multiple PUCCH resources, a first PUCCH repetition within the slot position.

In a eightieth aspect, alone or in combination with the seventy-ninth aspect, to receive the PUCCH repetition, the apparatus is further configured to receive, using a second PUCCH resource of the multiple PUCCH resources, a second PUCCH repetition within the slot position.

In a eighty-first aspect, alone or in combination with one or more of the seventy-ninth through eightieth aspects, the slot position includes a slot or a sub-slot of the slot.

In some aspects, an apparatus configured for wireless communication, such as a base station, is configured to identify a PRI field codepoint that maps to a set of one or more interpreted PRI values, and transmit DCI including the PRI field codepoint. The apparatus is also configured to receive PUCCH repetition within a slot position using multiple PUCCH resources corresponding to the one or more interpreted PRI values. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a eighty-second aspect, to receive the PUCCH repetitions, the apparatus is configured to receive, using a first PUCCH resource of the multiple PUCCH resources, a first PUCCH repetition within the slot position In a eighty-third aspect, alone or in combination with the eighty-second aspect, to receive the PUCCH repetitions, the apparatus is configured to receive, using a second PUCCH resource of the multiple PUCCH resources, a second PUCCH repetition within the slot position.

In a eighty-fourth aspect, alone or in combination with one or more of the eighty-second through eighty-third aspects, the set of one or more interpreted PRI values includes at least two interpreted PRI values.

In a eighty-fifth aspect, alone or in combination with one or more of the eighty-second through eighty-fourth aspects, the slot position includes a slot or a sub-slot of the slot.

In some aspects, an apparatus configured for wireless communication, such as a base station, is configured to generate a RRC configuration that includes data that indicates whether to transmit multiple PUCCH repetitions using a single PUCCH resource or multiple PUCCH resources, transmit the RRC configuration. The apparatus is also configured to receive the multiple PUCCH repetitions within a slot position using the multiple PUCCH resources. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a eighty-sixth aspect, the apparatus is further configured to determine whether to receive the multiple PUCCH repetitions.

In a eighty-seventh aspect, alone or in combination with the eighty-sixth aspect, the apparatus is further configured to determine whether to receive a PUCCH repetition within the slot position using a single PUCCH resource or the multiple PUCCH resources.

In a eighty-eighth aspect, alone or in combination with one or more of the eighty-sixth through eighty-seventh aspects, to receive the multiple PUCCH repetitions, the apparatus is configured to receive, using a first PUCCH resource of the multiple PUCCH resources, a first PUCCH repetition of the multiple PUCCH repetitions within the slot position.

In a eighty-ninth aspect, in combination with the eighty-eighth aspect, to receive the multiple PUCCH repetitions, the apparatus is further configured to receive, using a second PUCCH resource of the multiple PUCCH resources, a second PUCCH repetition of the multiple PUCCH repetitions within the slot position.

In a ninetieth aspect, alone or in combination with one or more of the eighty-sixth through eighty-ninth aspects, the slot position includes a slot or a sub-slot of the slot.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8-19 may include processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 8-19) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

What is claimed is:

1. A method of wireless communication performed by a user equipment (UE), the method comprising:
receiving Downlink Control Information (DCI) including a Physical Uplink Control Channel Resource Indicator (PRI) field codepoint;
configuring, based on a Radio Resource Control (RRC) configuration, the UE for mapping the PRI field codepoint to one or more integer interpreted PRI values, wherein whether the PRI field codepoint is mapped to one integer interpreted PRI value or is mapped to multiple integer interpreted PRI values is based on the RRC configuration; and
transmitting multiple Physical Uplink Control Channel (PUCCH) repetitions within a slot position using multiple PUCCH resources based on the one or more integer interpreted PRI values.

2. The method of claim 1, further comprising:
determining based on the PRI field codepoint, whether to transmit a PUCCH repetition within the slot position using a single PUCCH resource or transmit multiple PUCCH repetitions within the slot position using multiple PUCCH resources, and
wherein transmitting the multiple PUCCH repetitions comprises:
transmitting, using a first PUCCH resource of the multiple PUCCH resources, a first PUCCH repetition of the multiple PUCCH repetitions within the slot position, the first PUCCH resource associated with a first activated beam; and
transmitting, using a second PUCCH resource of the multiple PUCCH resources, a second PUCCH repetition of the multiple PUCCH repetitions within the slot position, the second PUCCH resource associated with a second activated beam different from the first activated beam.

3. The method of claim 1, wherein transmitting the multiple PUCCH repetitions within the slot position using multiple PUCCH resources is based on the RRC configuration comprising data indicating to use the multiple PUCCH resources, and further comprising mapping the value of the PRI field codepoint to the one or more integer interpreted PRI values.

4. The method of claim 3, further comprising receiving the RRC configuration.

5. The method of claim 3, further comprising:
receiving a Medium Access Control (MAC)-Control Element (CE); and
activating, based on the MAC-CE, a mapping functionality for mapping the PRI field codepoint to the one or more integer interpreted PRI values.

6. The method of claim 1, wherein:
the one or more integer interpreted PRI values includes multiple integer interpreted PRI values and the multiple interpreted integer PRI values comprise:
a first interpreted PRI value corresponding to a first PUCCH resource; and
a second interpreted PRI value corresponding to a second PUCCH resource; and
an at least one of the multiple integer interpreted PRI values has a same value as a value of the PRI field codepoint.

7. The method of claim 3, wherein the multiple PUCCH repetitions are transmitted within the slot position using the multiple PUCCH resources based on the one or more integer interpreted PRI values.

8. The method of claim 7, wherein transmitting the multiple PUCCH repetitions comprises:
transmitting, using a first PUCCH resource of the multiple PUCCH resources, a first PUCCH repetition of the multiple PUCCH repetitions within the slot position; and
transmitting, using a second PUCCH resource of the multiple PUCCH resources, a second PUCCH repetition of the multiple PUCCH repetitions within the slot position.

9. The method of claim 1, further comprising:
mapping the PRI field codepoint to the one or more integer interpreted PRI values based on a determination that the DCI points to multiple Transmission Configuration Indicator (TCI) states.

10. The method of claim 9, further comprising, based on a determination to perform the PUCCH repetitions using the multiple PUCCH resources:
selecting a first PUCCH resource as a first of the multiple PUCCH resources, the first PUCCH resource corresponding to a value of the PRI field codepoint; and
selecting a second PUCCH resource as a second of the multiple PUCCH resources.

11. The method of claim 10, wherein the second PUCCH resource is selected from a set of available PUCCH resources within a PUCCH resource set, excluding the selected PUCCH resource, based on:
not overlapping with the first PUCCH resource;
starting after the first PUCCH resource;
having a different activated beam from an activated beam of the first PUCCH resource;
having an activated beam corresponding to the same Quasi Co-Located (QCL) source as at least one TCI state pointed to by the DCI; or
a combination thereof.

12. The method of claim 1, further comprising transmitting, based on the PRI field codepoint, multiple PUCCH repetitions within the slot position using multiple PUCCH resources.

13. The method of claim 1, further comprising transmitting, based on the PRI field codepoint, a PUCCH repetition within the slot position using a single PUCCH resource.

14. An apparatus configured for wireless communication, the apparatus comprising:
at least one processor; and
a memory coupled to the at least one processor,
wherein the at least one processor is configured to:
receive Downlink Control Information (DCI) including a Physical Uplink Control Channel Resource Indicator (PRI) field codepoint;
map the PRI field codepoint to one or more integer interpreted PRI values based on a Radio Resource Control (RRC) configuration, wherein whether the PRI field codepoint is mapped to one integer interpreted PRI value or is mapped to multiple integer interpreted PRI values is based on the RRC configuration; and
initiate transmission of multiple Physical Uplink Control Channel (PUCCH) repetitions within a slot position using multiple PUCCH resources based on the one or more integer interpreted PRI values.

15. The apparatus of claim 14, wherein:
the DCI includes a Downlink (DL) DCI scheduling a Physical Downlink Shared Channel (PDSCH), and a PUCCH repetition is associated with a Hybrid Automatic Repeat Request (HARQ)-ACK codebook, and
the slot position includes a slot or a sub-slot of the slot.

16. The apparatus of claim 14, wherein the at least one processor is configured to receive multiple DCIs, the multiple DCIs including the DCI, each of the multiple DCIs including a corresponding PRI field codepoint and a corresponding Hybrid Automatic Repeat Request (HARQ) feedback timing indicator field, and wherein the corresponding values of the HARQ feedback timing indicator field of the multiple DCIs indicate the same slot position for PUCCH transmission of HARQ-ACK feedback.

17. The apparatus of claim 16, wherein the at least one processor is further configured to:
identify a last detected DCI of the multiple DCIs; and
determine to perform PUCCH repetition in response to the corresponding PRI field codepoint of the last detected DCI indicating multiple PRI values.

18. The apparatus of claim 16, wherein the at least one processor is further configured to determine to perform PUCCH repetition based on at least one DCI of the multiple DCIs having a corresponding PRI field codepoint that indicates multiple PRI values.

19. The apparatus of claim 18, wherein the at least one processor is further configured to:
identify a last detected DCI of the multiple DCIs; and
based on the detected DCI corresponding to a single PRI value and based on the at least one DCI of the multiple DCIs having a corresponding PRI field codepoint that indicates multiple PRI values:
use a first PUCCH resource corresponding to the single PRI value; and
use a second PUCCH resource corresponding to a most recently received DCI of the at least one DCI that includes a value of the PRI field codepoint corresponding to the multiple PRI values.

20. The apparatus of claim 14, wherein the at least one processor is further configured to:
receive multiple DCIs comprising a set of DCIs;
identify a last detected DCI of the set of DCIs; and
based on the detected DCI corresponding to a single PRI value and based on at least one DCI of the set of DCIs having a corresponding PRI field codepoint that indicates multiple PRI values:
use a first PUCCH resource corresponding to the single PRI value; and
use a second PUCCH resource corresponding to a most recently received DCI of the at least one DCI that includes a value of the PRI field codepoint corresponding to the multiple PRI values.

21. The apparatus of claim 14, wherein the at least one processor is further configured to receive the RRC configuration.

22. The apparatus of claim 14, wherein the at least one processor is further configured to determine whether to transmit a PUCCH repetition within the slot position using a single PUCCH resource or transmit multiple PUCCH repetitions within the slot position using multiple PUCCH resources.

23. A method of wireless communication, the method comprising:
transmitting a Radio Resource Control (RRC) configuration associated with configuring a user equipment (UE) to map a Physical Uplink Control Channel Resource Indicator (PRI) field codepoint to one or more integer interpreted PRI values, wherein whether the PRI field codepoint is mapped to one integer interpreted PRI value or is mapped to multiple integer interpreted PRI values is based on the RRC configuration;

identifying, by a network entity, the PRI field codepoint that indicates to perform Physical Uplink Control Channel (PUCCH) repetition within a slot position using a single PUCCH resource or multiple PUCCH resources;

transmitting, by the network entity, Downlink Control Information (DCI) including the PRI field codepoint; and receiving, by the network entity, a PUCCH repetition from the UE within the slot position using the multiple PUCCH resources.

24. The method of claim 23, wherein receiving the PUCCH repetition comprises:

receiving, by the network entity using a first PUCCH resource of the multiple PUCCH resources, a first PUCCH repetition within the slot position; and receiving, by the network entity using a second PUCCH resource of the multiple PUCCH resources, a second PUCCH repetition within the slot position.

25. The method of claim 23, wherein the PRI field codepoint indicates to perform PUCCH repetition within the slot position using the multiple PUCCH resources.

26. The method of claim 23, further comprising:

determining whether to receive multiple PUCCH repetitions;

determining whether to receive a PUCCH repetition within the slot position using the single PUCCH resource or the multiple PUCCH resources; or a combination thereof.

27. The method of claim 23, wherein the PRI field codepoint maps to the one or more integer interpreted PRI values or indicates to perform a mapping of the PRI field codepoint to the one or more integer interpreted PRI values.

28. The method of claim 27, wherein the one or more integer interpreted PRI values includes at least two integer interpreted PRI values.

29. The method of claim 23, further comprising:

generating, by the network entity, the RRC configuration that includes data that indicates whether to transmit multiple PUCCH repetitions using the single PUCCH resource or multiple PUCCH resources.

30. The method of claim 23, wherein the slot position includes a slot or a sub-slot of the slot.

31. A network entity configured for wireless communication, the network entity comprising:

at least one processor; and a memory coupled to the at least one processor, wherein the at least one processor is configured to:

initiate transmission of a Radio Resource Control (RRC) configuration associated with configuring a user equipment (UE) to map a Physical Uplink Control Channel Resource Indicator (PRI) field codepoint to a one or more integer interpreted PRI values, wherein whether the PRI field codepoint is mapped to one integer interpreted PRI value or is mapped to multiple integer interpreted PRI values is based on the RRC configuration;

identify the PRI field codepoint that indicates to perform Physical Uplink Control Channel (PUCCH) repetition within a slot position using a single PUCCH resource or multiple PUCCH resources;

initiate transmission of Downlink Control Information (DCI) including the PRI field codepoint; and receive PUCCH repetition within the slot position using the multiple PUCCH resources.

32. The network entity of claim 31, wherein, to receive the PUCCH repetition, the at least one processor is further configured to:

receive, using a first PUCCH resource of the multiple PUCCH resources, a first PUCCH repetition within the slot position; and receive, using a second PUCCH resource of the multiple PUCCH resources, a second PUCCH repetition within the slot position.

33. The network entity of claim 31, wherein the PRI field codepoint indicates to perform PUCCH repetition within the slot position using the multiple PUCCH resources.

* * * * *